(12) United States Patent
Kiyuna

(10) Patent No.: US 7,136,540 B2
(45) Date of Patent: Nov. 14, 2006

(54) PICTURE REGION EXTRACTION METHOD AND DEVICE

(75) Inventor: Tomoharu Kiyuna, Tokyo (JP)

(73) Assignee: NEC Corporation, Tokyo (JP)

( * ) Notice: Subject to any disclaimer, the term of this patent is extended or adjusted under 35 U.S.C. 154(b) by 772 days.

(21) Appl. No.: 10/409,140

(22) Filed: Apr. 9, 2003

(65) Prior Publication Data

US 2003/0194132 A1 Oct. 16, 2003

(30) Foreign Application Priority Data

Apr. 10, 2002 (JP) ............................... 2002-108608

(51) Int. Cl.
*G06K 9/20* (2006.01)
(52) U.S. Cl. ....................... 382/282; 382/170; 382/228
(58) Field of Classification Search ................ 382/170, 382/171, 176, 180, 224, 228, 282; 358/453, 358/462
See application file for complete search history.

(56) References Cited

U.S. PATENT DOCUMENTS 6,415,048 B1 * 7/2002 Schneider ................... 382/131

2003/0061185 A1 * 3/2003 Lee et al. ...................... 706/20
2004/0125877 A1 * 7/2004 Chang et al. .......... 375/240.28

FOREIGN PATENT DOCUMENTS

JP 2001-92980 6/2001

OTHER PUBLICATIONS

Nobuteru Takao et al., "A Use of Mean Field Decomposition in MRF-Based Unsupervised Textured Image Segmentation", Electronic Information Communication Report, Japan, Corporate Electronic Information Communication Association, Sep. 25, 1998, vol. 98, No. 306, pp. 7-12.

* cited by examiner

*Primary Examiner*—Yon J. Couso
(74) *Attorney, Agent, or Firm*—Young & Thompson

(57) ABSTRACT

The picture region extraction method coarse-grains this picture data space, calculates a coarse-grained empirical probability distribution, initializes parameters, calculates a coarse-grained conditional probability distribution and a class membership probability, updates the parameters, and calculates an evaluation function, each process being repeated until there is no change in the evaluation function, at which point, a picture region is extracted based on the class membership probability.

20 Claims, 16 Drawing Sheets

PICTURE REGION EXTRACTION METHOD AND DEVICE

BACKGROUNDS OF THE INVENTION

1. Field of the Invention

The present invention relates to a technology for extracting a target object region from picture data that include a region extraction target image, based on attributes of pixels of a picture; particularly, the invention relates to a picture region extraction method and device that extract a region such as a specific organ, tumor, cell nucleus, and glandular cavity in a picture from picture data taken with an MRI apparatus or a CT scanner, or a cross-sectional view of a biological tissue observed with a biological microscope.

2. Description of the Related Art

The following method of the prior art has been known for extracting an image of a specific object from a picture.

(for example, Japanese Patent laid-open (Kokai) No. 2001-92980; hereinafter referred to as Document 1.))

In Document 1, the configuration is such that, from picture data containing the image of an image to be subjected to contour extraction, the regions to which each point belongs are separated and the boundaries between the regions are extracted as contours, based on the attribute of each point of the picture and using region membership probability, which is the probability that each of the points on the picture belongs to each of the regions. By adopting such a configuration, the contour of each region can be automatically extracted, and the extraction of the contour region can be accelerated, without explicitly setting a threshold for region classification.

In the extraction of the contour region in Document 1, the expected value of the region membership probability is calculated from picture data, which is the probability for each point on a picture that it belongs to each of the regions, an evaluation function is calculated based on the mixture probability distribution determined from the region membership probability and a region parameter, each region is separated based on the region membership probability, and the contour is extracted based on the separated regions, therefore, when determining the evaluation function, it is necessary to obtain a sum for all the picture points (pixels), so that the calculation of the evaluation function has to be repeated several times in order to determine an optimal parameter.

Therefore, the conventional method has the problem that enormous amounts of time are needed to extract the regions as the size of the picture becomes large.

SUMMARY OF THE INVENTION

Considering the above problem, the present invention provides a picture region extraction method and device that extract a target region from a picture at higher speed with higher accuracy without explicitly setting a threshold.

According to the first aspect of the invention, a picture region extraction method, which extracts a desired region from picture data containing an image to be subjected to region extraction by classifying each pixel on the picture into a plurality of classes, comprises the steps of a first step in which the data space constituted by all the attribute values that may be taken by the each pixel on the picture is divided into subspaces with a given resolution, a collection of pixels, each of which takes an attribute value in the each subspace, the average of the attribute values of the pixels, and the number of the pixels are retained to constitute a coarse-grained space, a second step in which the number of pixels in the each subspace is divided by the total number of pixels contained in the picture to calculate the coarse-grained empirical probability distribution in the coarse-grained data space, a third step in which the class parameter, the number of the classes, and the mixture ratio of the classes, which define the attributes of the each class, are initialized, a fourth step in which a conditional probability distribution under the class being specified is calculated from the class parameter that defines the attributes of the each class, and the conditional probability distribution under the class being specified is averaged within the each subspace to calculate a coarse-grained conditional probability distribution, a fifth step in which a class membership probability, which is the probability that each pixel constituting the picture belongs to the each class, is calculated by multiplying the class mixture ratio by the coarse-grained conditional probability distribution, a sixth step in which the class parameter and the class mixture ratio are updated so as to increase an evaluation function, a seventh step in which a coarse-grained log-likelihood is calculated as the evaluation function using the coarse-grained conditional probability distribution, an eighth step in which whether the evaluation function satisfies a given termination condition or not is examined, and a ninth step in which after the evaluation function satisfies the given termination condition, the class parameter and the class mixture ratio are retained, and the region each pixel belongs to is determined based on the class membership probability to extract the desired region, the fourth, fifth, sixth, seventh and eighth steps being repeated until the evaluation function satisfies the given condition.

In the preferred construction, in the fourth step, when calculating the coarse-grained conditional probability distribution, the average value of the data included in the each subspace is calculated, and the average value is used to calculate the coarse-grained conditional probability distribution in the each subspace.

In another preferred construction, the picture region extraction method further comprises a tenth step in which whether the coarse-grained resolution is equal to the original resolution or not is examined when the evaluation function satisfies the given terminal condition in the eighth step, and an eleventh step in which the resolution of the subspace is reverted to the original resolution if the resolution of the coarse-graining is not the original resolution, the fourth, fifth, sixth, seventh, and eighth steps being repeated until the given condition is satisfied, using the class parameter and the class mixture ratio that are retained in the ninth step as the initial value in the third step.

In another preferred construction, in the fourth step, when calculating the coarse-grained conditional probability distribution, the average value of the data included in the each subspace is calculated, and the average value is used to calculate the coarse-grained conditional probability distribution in the each subspace, which comprises a tenth step in which whether the coarse-grained resolution is equal to the original resolution or not is examined when the evaluation function satisfies the given terminal condition in the eighth step, and an eleventh step in which the resolution of the subspace is reverted to the original resolution if the resolution of the coarse-graining is not the original resolution, the fourth, fifth, sixth, seventh, and eighth steps being repeated until the given condition is satisfied, using the class parameter and the class mixture ratio that are retained in the ninth step as the initial value in the third step.

In another preferred construction, in the ninth step, the estimated class mixture ratio is multiplied by the total number of pixels constituting the picture to calculate the number of pixels belonging to the each class, and the pixels in decreasing order of the class membership probability are selected to determine the pixels belonging to the each class.

In another preferred construction, in the seventh step, AIC is used as the evaluation function, and the parameter is changed so that the evaluation function may be decreased in the sixth step.

In another preferred construction, in the seventh step, MDL is used as the evaluation function, and the parameter is changed so that the evaluation function may be decreased in the sixth step.

In another preferred construction, in the seventh step, Structural Risk is used as the evaluation function, and the parameter is changed so that the evaluation function may be decreased in the sixth step.

In another preferred construction, the third step comprises a first step in which a neighborhood radius which defines whether the each subspace is close to one another, and the number of the classes are set, a second step in which the representative value of each subspace is set for each subspace, a third step in which the collection of the classification target subspace is set, a fourth step in which the subspace with the highest coarse-grained empirical probability is selected among the classification target subspaces, a fifth step in which all the subspaces having a representative value whose distance to the representative value of the subspace with the highest coarse-grained empirical probability falls within the neighborhood radius are selected as a neighborhood collection, a sixth step in which whether the shortest distance between the representative value of the subspace included in a class for which classification has already been completed, and the representative value of the subspace included in the neighborhood collection is larger than the neighborhood radius is examined, a seventh step in which the neighborhood collection is defined as a new class if the shortest distance between the representative value of the subspace included in a class for which classification has already been completed and the representative value of the subspace included in the neighborhood collection is larger than the neighborhood radius, the neighborhood collection is deleted from the classification target subspace, and the fourth steps and later are repeated, an eighth step in which if the shortest distance is equal to or shorter than the neighborhood radius, the neighborhood collection is added to the classified classes, and the neighborhood collection is deleted from the classification target subspace, a ninth step in which whether the classification target subspace is an empty collection or not is examined, a tenth step in which if the classification target subspace is not an empty collection, the fourth step and later are repeated, and if the classification target subspace is an empty collection, whether the number of classes for which classification has already been completed is equal to a given number or more is examined, an eleventh step in which if the number of classes for which classification has already been completed is fewer than the given number, the neighborhood radius is diminished, and the third step and later are repeated, a twelfth step in which if the classification target subspace is an empty collection and the number of classified classes is greater than a given number, the class parameter is calculated within each class and taken as the initial value of the class parameter, also, the ratio of the number of subspaces included in each class is taken as the initial value of the class mixture ratio.

According to the second aspect of the invention, a picture region extraction device, which extracts a desired region from picture data containing an image to be subjected to region extraction by classifying each pixel on the picture into a plurality of classes, comprises an input device for reading picture data, a region coarse-graining device in which the data space constituted by all the attribute values that may be taken by the each pixel on the picture is divided into subspaces with a given resolution, a collection of pixels, each of which takes an attribute value in the each subspace, the average of the attribute values of the pixels, and the number of the pixels are retained to constitute a coarse-grained data space, a coarse-grained empirical probability distribution calculation device in which the number of pixels in the each subspace is divided by the total number of pixels contained in the picture to calculate the coarse-grained empirical distribution in the coarse-grained data space, a coarse-grained conditional probability distribution calculation device in which the class parameter, the number of the classes, and the mixture ratio of the classes, which define the attributes of the each class, are initialized, a conditional probability distribution under the class being specified is calculated from the class parameter that defines the attributes of the each class, and the conditional probability distribution under the class being specified is averaged within the each subspace to calculate the coarse-grained conditional probability distribution, a class membership probability calculation device in which a class membership probability, which is the probability that each pixel constituting the picture belongs to the each class, is calculated by the coarse-grained conditional probability distribution, a parameter update device in which the parameter is updated so that when a coarse-grained log-likelihood is used as the evaluation function, the evaluation function may be increased and when AIC, MDL, or Structural Risk is used as the evaluation function, the evaluation function may be decreased, an evaluation function calculation device in which the evaluation function is calculated using either the coarse-grained log-likelihood, the AIC, the MDL, or the Structural Risk, a region extraction device in which whether the evaluation function satisfies a given termination condition or not is examined, after the evaluation function satisfies the given termination condition, the parameter is retained, and the class the each pixel belongs to is determined based on the class membership probability to extract a region, and an output device for outputting the extracted region.

In the preferred construction, the picture region extraction device further comprises a resolution reverting device in which after verification that the evaluation function satisfies the given termination condition, whether the coarse-grained resolution is equal to the original resolution or not is examined, and the resolution of the data space is reverted to the original resolution.

According to another aspect of the invention, a program allowing a computer to execute functions for extracting a desired picture region from picture data containing an image to be subjected to region extraction by classifying each pixel on the picture into a plurality of classes, comprises the functions of:

a first function in which the data space constituted by all the attribute values that may be taken by the each pixel constituting the picture is divided into subspaces with a given resolution, a collection of pixels, each of which takes an attribute value in the each subspace, the average of the attribute values of the pixels, and the number of the pixels are retained to constitute a coarse-grained space, a second function in which the number of pixels in the each subspace is divided by the total number of pixels contained in the picture to calculate the coarse-grained empirical probability distribution in the coarse-grained data space, a third function in which the class parameter, the number of the classes, and the mixture ratio of the classes, which define the attributes of the each class, are initialized, a fourth function in which a conditional probability distribution under the class being specified is calculated from the class parameter that defines the attributes of the each class, and the conditional probability distribution under the class being specified is averaged within the each subspace to calculate a coarse-grained conditional probability distribution, a fifth function in which a class membership probability, which is the probability that each pixel constituting the picture belongs to the each class, is calculated by multiplying the class mixture ratio by the coarse-grained conditional probability distribution, a sixth function in which the class parameter and the class mixture ratio are updated so as to increase an evaluation function, a seventh function in which a coarse-grained log-likelihood is calculated as the evaluation function using the coarse-grained conditional probability distribution, an eighth function in which whether the evaluation function satisfies a given termination condition or not is examined, and a ninth function in which after the evaluation function satisfies the given termination condition, the class parameter and the class mixture ratio are retained, and the region each pixel belongs to is determined based on the class membership probability to extract the desired region, the fourth, fifth, sixth, seventh, and eighth functions being repeated until the evaluation function satisfies the given condition.

In the preferred construction, the fourth function comprises a function in which, when calculating the coarse-grained conditional probability distribution, the average value of the data included in the each subspace is calculated, and the average value is used to calculate the coarse-grained conditional probability distribution in the each subspace.

In another preferred construction, the picture region extraction program further comprises a tenth function in which whether the coarse-grained resolution is equal to the original resolution or not is examined when the evaluation function satisfies the given terminal condition in the eighth function, and an eleventh function in which the resolution of the subspace is reverted to the original resolution if the resolution of the coarse-graining is not the original resolution, the fourth, fifth, sixth, seventh, and eighth functions being repeated until the evaluation function satisfies the given condition, using the class parameter and the class mixture ratio that are retained in the ninth function as the initial value in the third function.

In another preferred construction, the fourth function comprises a function in which, when calculating the coarse-grained conditional probability distribution, the average value of the data included in the each subspace is calculated, and the average value is used to calculate the coarse-grained conditional probability distribution in the each subspace, which comprises a tenth function in which whether the coarse-grained resolution is equal to the original resolution or not is examined when the evaluation function satisfies the given terminal condition in the eighth function, and an eleventh function in which the resolution of the subspace is reverted to the original resolution if the resolution of the coarse-graining is not the original resolution, the fourth, fifth, sixth, seventh, and eighth functions being repeated until the evaluation function satisfies the given condition, using the class parameter and the class mixture ratio that are retained in the ninth function as the initial value in the third function.

In another preferred construction, the ninth function comprises a function in which the estimated class mixture ratio is multiplied by the total number of pixels constituting the picture to calculate the number of pixels belonging to the each class, and the pixels in decreasing order of the class membership probability are selected to determine the pixels belonging to the each class.

In another preferred construction, the seventh function is a function for calculating AIC instead of the coarse-grained log-likelihood as the evaluation function, and the sixth function is a function for changing the parameter so that the evaluation function may be decreased.

In another preferred construction, the seventh function is a function for calculating MDL instead of the coarse-grained log-likelihood as the evaluation function, and the sixth function is a function for changing the parameter so that the evaluation function may be decreased.

In another preferred construction, the seventh function is a function for calculating Structural Risk instead of the coarse-grained log-likelihood as the evaluation function, and the sixth function is a function for changing the parameter so that the evaluation function may be decreased.

In another preferred construction, the third function comprises a first step in which a neighborhood radius which defines whether the each subspace is close to one another, and the number of the classes are set, a second step in which the representative value of each subspace is set for each subspace, a third step in which the collection of the classification target subspace is set, a fourth step in which the subspace with the highest coarse-grained empirical probability is selected among the classification target subspaces, a fifth step in which all the subspaces having a representative value whose distance to the representative value of the subspace with the highest coarse-grained empirical probability falls within the neighborhood radius are selected as a neighborhood collection, a sixth step in which whether the shortest distance between the representative value of the subspace included in a class for which classification has already been completed, and the representative value of the subspace included in the neighborhood collection is larger than the neighborhood radius is examined, a seventh step in which the neighborhood collection is defined as a new class if the shortest distance between the representative value of the subspace included in a class for which classification has already been completed and the representative value of the subspace included in the neighborhood collection is larger than the neighborhood radius, the neighborhood collection is deleted from the classification target subspace, and the fourth steps and later are repeated, an eighth step in which if the shortest distance is equal to or shorter than the neighborhood radius, the neighborhood collection is added to the classified classes, and the neighborhood collection is deleted from the classification target subspace, a ninth step in which whether the classification target subspace is an empty collection or not is examined, a tenth step in which if the classification target subspace is not an empty collection, the fourth step and later are repeated, and if the classification target subspace is an empty collection, whether the number of classes for which classification has already been completed is equal to a given number or more is examined, an eleventh step in which if the number of classes for which classification has already been completed is fewer than the given number, the neighborhood radius is diminished, and the third step and later are repeated, a twelfth step in which if the classification target subspace is an empty collection and the number of classified classes is greater than a given number, the class parameter is calculated within each class and taken as the initial value of the class parameter, also, the ratio of the number of subspaces included in each class is taken as the initial value of the class mixture ratio.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
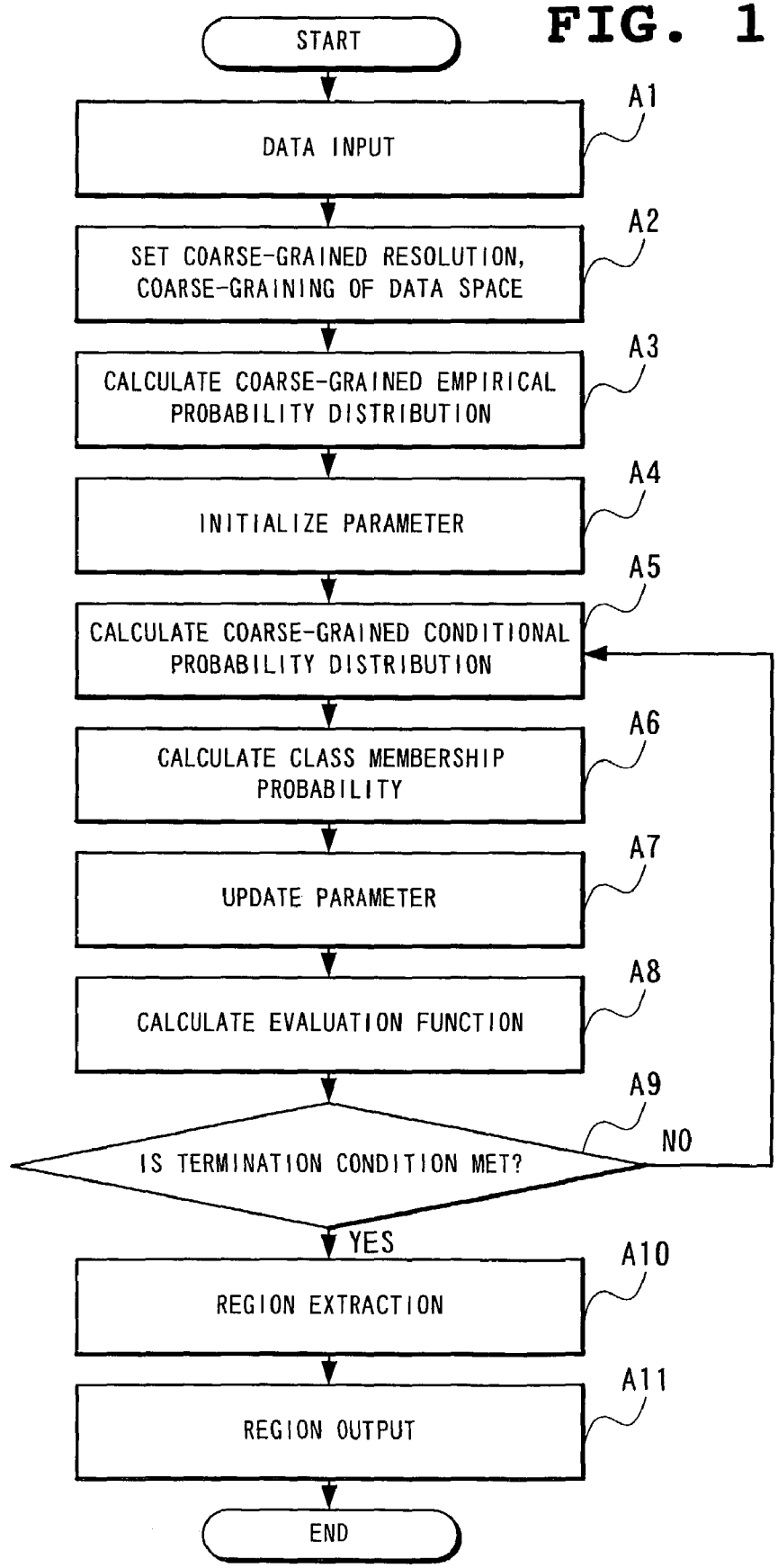
FIG. 1 is a flow chart illustrating the processing procedure in a first embodiment of the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the present invention, as in the invention described in Document 1, a region is extracted based on the estimated class membership probability. This characteristic is advantageous in that a threshold can be set automatically. However, there is the problem that, in order to estimate the class membership probability, it is necessary to repeat the update of a parameter several times (usually about fifty times), such that calculation requires time.

Therefore, the present invention uses coarse-grained probability distribution as a model of the source of picture data, and data space is also coarse-grained accordingly. In this way, calculation for several thousands of subspaces can be substituted for conventional calculation in which conditional probability distribution and class membership probability have to be calculated for several hundreds of thousand of data. This characteristic allows the time needed for region extraction to be significantly reduced.

Although the accuracy of estimated class parameter is lower due to coarse-graining, in the present invention, the class parameter is not directly used, instead, region extraction is performed based on the class membership probability calculated from the parameter, so that region extraction can be performed without being affected by errors due to coarse-graining, as described below.

Below, effectiveness of operation of the present invention will be described in more detail.

In the picture region extraction method according to the present invention, the attribute value possessed by each pixel constituting a picture is regarded as a random variable, and a desired region is extracted based on the probability distribution of estimated pixel values. For example, the value of intensity for a monochrome picture, and intensities of red (R), green (G), and blue (B) color components for a color picture can be used as attribute values.

To extract a desired region, each pixel must be classified into a plurality of groups having similar attributes, based on the attribute value of each pixel. A collection of pixels having similar attributes is herein referred to as a class. Each class is characterized by, for example, an average value and the distribution of the attribute values belonging to the class. The features of these classes are hereinafter referred to as "class parameter" of the class, and expressed as $\phi i$ (i=1 , , , k), where k is the number of classes. Under such formulation, the probability that a jth pixel takes the attribute value of $x_j$ can be expressed with the following mixture distribution:

$$p(x_j) = \sum_{i=1}^{k} w_i f(x_j | \phi_i) \quad \text{expression (1)}$$

where $f(x_j|\phi i)$ is the conditional probability distribution under the assumption that data is derived from the ith class, and $w_i$ is the mixture ratio of each class, and satisfies $$\sum_{i=1}^{k} w_i = 1$$

For example, $x_j$ takes an integer value e.g. from 0 to 255 for a monochrome picture, and is represented by a three-dimensional vector $(x_{j1}, x_{j2}, x_{j3})$ the components of which are the values of the RGB color components for a color picture, where each $x_{jl}$ (l=1, 2, 3) takes an integer value e.g. from 0 to 255.

The mixture ratio $w_i$ represents the area ratio of the regions belonging to different classes. For example, it is assumed that there is a monochrome picture constituted by two regions; a bright picture region (referred to as Class 1) characterized by an average intensity of 200 and a intensity standard deviation of 20, and a dark picture region (referred to as Class 2) characterized by an average intensity of 50, and intensity standard deviation of 10. In addition, it is assumed that the bright region occupies 70% of the area of the picture, and the dark region occupies 30%. In this case, the number of the classes is k=2, the class parameters are $\phi 1=(200, 20)$ and $\phi 2=(50, 10)$, and the mixture distribution of the picture may be expressed as $$p(x_j)=0.7(x_j|200,20)+0.3(x_j|50,10) \quad \text{expression (2)}.$$

Below, the class mixture ratio $w_i$ and the class parameter $\phi i$ are collectively referred to as $\theta i$. In the following, a simple mention of "parameter" means $\theta i$.

The picture region extraction method according to the present invention estimates a parameter that maximizes the average log-likelihood defined as follows, $$L = \frac{1}{n}\sum_{j=1}^{n} \log p(x_j) = \frac{1}{n}\sum_{j=1}^{n} \log\left[\sum_{i=1}^{k} w_i f(x_j | \phi_i)\right] \quad \text{expression (3)}$$

and uses the information on the estimated parameter to extract the region. Here, n is the number of pixels contained in the picture. Such a statistical technique is called the maximum likelihood method.

However, it is generally difficult to estimate a parameter that maximizes the average log-likelihood L. For this reason, instead of the average log-likelihood L, an expected value Q of complete log-likelihood expressed by the following quantity:

$$Q = \frac{1}{n}\sum_{j=1}^{n}\sum_{i=1}^{k} \pi_{ij}\log[w_i f(x_j | \phi_i)] \quad \text{expression (4)}$$

can be used to estimate the parameter. Here, $$\pi_{ij} = \frac{w_i f(x_j | \phi_i)}{\sum_{l=1}^{k} w_l f(x_j | \phi_l)} \quad \text{expression (5)}$$

is the probability that the jth pixel belongs to the ith class. In the present invention, this is referred to as the class membership probability. It has been mathematically proven that, if the parameter is updated so that Q increases, the above-mentioned average log-likelihood L also definitely increases, and the proof is detailed in, for example, A. P. Dempster, N. M. Laird, and D. B. Rubin, Maximum Likelihood From Incomplete Data via The EM Algorithm, J. Roy. Stat. Soc. Vol.30, pp.205 248, 1977 (hereinafter referred to as Document 2).

In the present invention, the region is actually extracted according to the estimated parameter in the following manner. First, starting with an appropriate initial parameter, the class membership probability given by Expression (5) is determined. The parameters w, and $\phi$ are then updated so as to increase Q, and Q is calculated again. Finally, this procedure is repeated until Q no longer increases.

To extract, for example, points belonging to the ith class out of k classes, the value of membership probability to the ith class is examined, and pixels having a probability value of a given value or higher are classified as belonging to the class. At the point of time when classification of all the pixels is completed, a desired region can be automatically extracted by selecting among k classes the class having the desired attribute, and extracting the pixels belonging to the class.

Coarse-grained probability distribution is introduced in the present invention, in order to perform rapidly the maximization of Q. The coarse-grained probability distribution is constituted by breaking down the space consisting of all the values that the data may take (hereinafter referred to as data space) into N non-crossing subspaces, and assigning a probability to each subspace.

Specifically, coarse-grained conditional probability distribution in the jth subspace is defined by $$\tilde{f}_j(\phi_i) = \frac{1}{m(A_j)} \int_{A_j} f(x|\phi_i) dx \qquad \text{expression (6)}$$

and the coarse-grained conditional probability distribution is expressed as $$\tilde{f}(x|\phi_i) = \sum_{j=1}^{N} \tilde{f}_j(\phi_i) I_{A_j}(x) \qquad \text{expression (7)}$$

where $A_j$ is the jth subspace. If D is the entire data space, $$D = \cup_j A_j, \ A_i \cap A_j = 0 \ (i \neq j) \qquad \text{expression (8)}$$

is satisfied. In addition, IA(x) is an indicator function, which is 1 when a data value is included in the subspace A, 0 otherwise, and $m(A) = \int_A dx$ is a measure of A (it represents the area of A when the data space is two-dimensional, and the volume of A when the data space is three-dimensional.)

When the coarse-grained conditional probability distribution defined as above is used, Q can be re-written as $$\tilde{Q} = \sum_{i=1}^{k} \tilde{q}_j \tilde{\pi}_{ij} \log[w_i \tilde{f}_j(\phi_i)] \qquad \text{expression (9)}$$

Here, $$\tilde{q}_j = \frac{1}{n} \sum_{l=1}^{n} I_{A_j}(x_l) \qquad \text{expression (10)}$$

is the coarse-grained empirical probability distribution, and $$\tilde{\pi}_{ij} = \frac{w_i \tilde{f}_j(\phi_i)}{\sum_{i=1}^{k} w_i \tilde{f}_j(\phi_i)} \qquad \text{expression (11)}$$

is the coarse-grained class membership probability. By maximizing the coarse-grained complete log-likelihood obtained by Expression (9), the following coarse-grained average log-likelihood:

$$\tilde{L} = \sum_{j=1}^{N} \tilde{g}_j \log\left[\sum_{i=1}^{k} w_j \tilde{f}_j(\phi_i)\right] \qquad \text{expression (12)}$$

can be maximized.

Comparing with original Q, the coarse-grained complete log-likelihood given by Expression (9) requires summing over subspaces only, while Q given by Expression (4) requires summing over all the data. As described below, this improvement allows the amount of calculation to be significantly reduced in the present invention. For example, a picture of 512×512 pixels requires that more than 260 thousand data be summed, whereas when the coarse-grained distribution according to the present invention is used, the amount of sums over the subspaces can be reduced to about 1000, allowing a rapid estimation.

In the picture region extraction method according to the present invention, the coarse-grained probability value in each subspace is approximated by the probability value of the average value of the data included in the subspace.

$$\tilde{f}_j(\phi_i) = f(\tilde{x}_j|\phi_i) \qquad \text{expression (13)}$$

where $$\tilde{x}_j = \frac{1}{\sum_{l=1}^{n} I_{A_j}(x_l)} \sum_{l=1}^{n} x_l I_{A_j}(x_l) \qquad \text{expression (14)}$$

is the average value of the data included in j subspaces $A_j$. This approximation allows the operation of integration (or total sum) in the subspace to be omitted, allowing further reduction in the amount of calculation.

In the picture region extraction method according to the present invention, taking the parameter estimated using the coarse-grained probability distribution as the initial value, estimation is performed again with the original resolution. In this case, since a nearly optimal parameter has been already obtained using the coarse-grained probability distribution, the number of necessary sequential updates of parameters is far less than in case where the estimation is performed with the original resolution from the beginning, therefore, highly accurate estimation can be performed rapidly.

In the picture region extraction method according to the present invention, when a region is extracted, the number of pixels belonging to the ith region is estimated by multiplying the estimated mixture ratio $w_i$ by the total pixel number n. Then, the top $n_i$ pixels in decreasing order of the region membership probability are extracted as pixels belonging to this region. This method allows a threshold to be automatically determined, whereby which value of probability value should be regarded as belonging to the region is defined.

In the picture region extraction method according to the present invention, an AIC, an MDL, and a Structural Risk are respectively used as an evaluation function, and the model that provides a result with the lowest value is selected. Maximum likelihood estimation has the problem that the actual number of parameters cannot be determined since generally, the larger the number of parameters, the better the value it gives for evaluation value.

In contrast, the evaluation function according to the present invention has the property that the value of the evaluation function increases inversely when excess number of parameters is used. This allows the optimal number of parameters to be estimated. In case of an application to region extraction, it is possible to estimate how many types of regions constitute the picture, and the appropriate number of regions.

Next, the preferred embodiment of the present invention will be described in detail with reference to drawings. In addition, the symbols used in the description below follow the description of symbols used above unless otherwise indicated. Moreover, although in the embodiment below, description will be given by taking as an example a case where each cellular organization (nucleus, glandular cavity) is extracted from a color micrograph of stained cells, any image recorded as a picture may be used in a method similar to the method described below.

Figure 2:
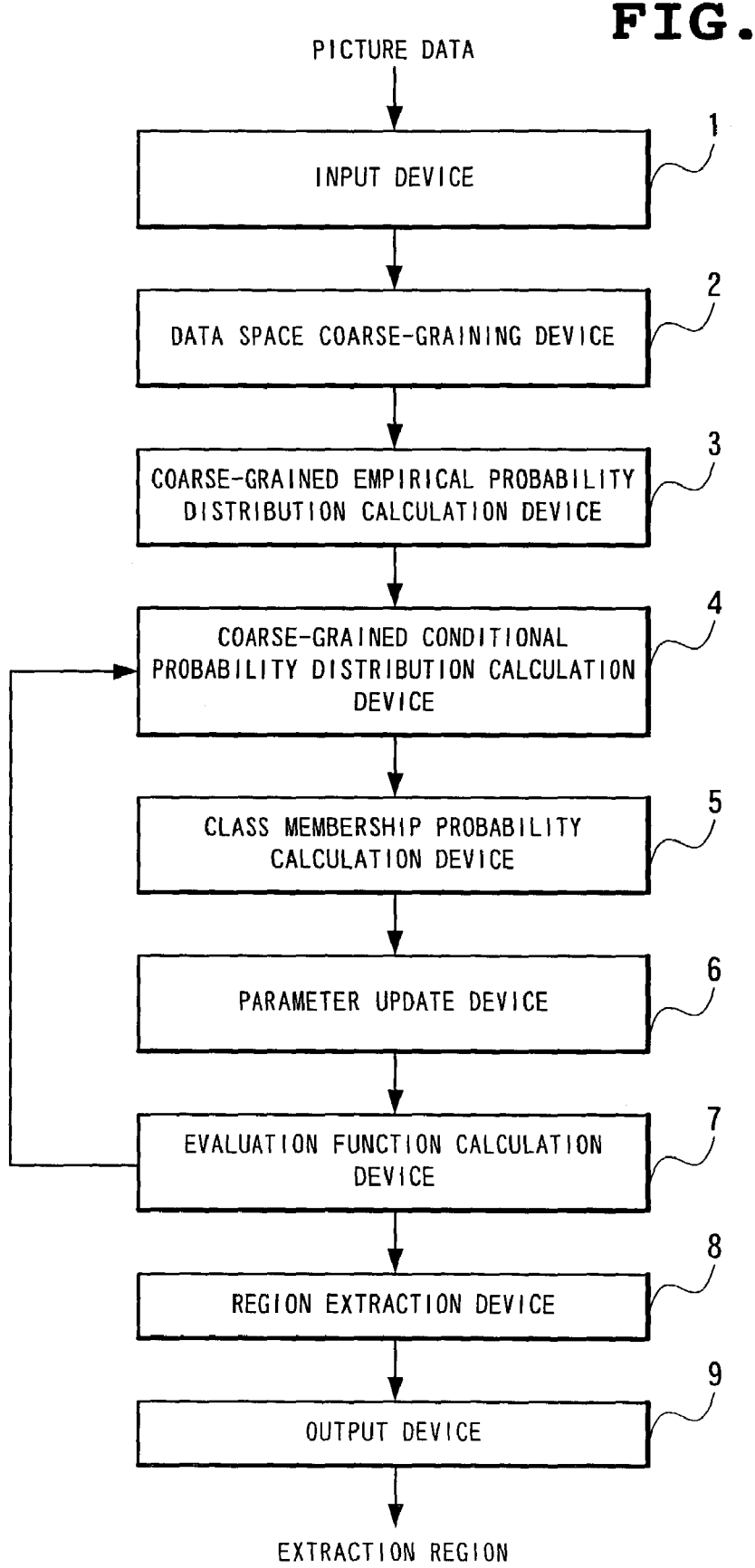
FIG. 2 is a block diagram illustrating the configuration of a picture region extraction device in the first embodiment of the present invention.

FIG. 1 is a flow chart illustrating the processing procedure in a picture region extraction method in a first embodiment of the present invention. Moreover, FIG. 2 is a block diagram illustrating the configuration of a picture region extraction device of the present embodiment.

The picture region extraction device of the present invention is composed of an input device 1 for reading picture data, a data space coarse-graining device 2, a coarse-grained empirical probability distribution calculation device 3, a coarse-grained conditional probability distribution calculation device 4, a class membership probability calculation device 5, a parameter update device 6, an estimation function calculation device 7, a region extraction device 8, and an output device 9.

The processing of the picture region extraction device of the present invention will be described below with reference to FIGS. 1 and 2.

The input device 1 inputs the color picture of cells observed with a biological microscope and such (Step A.1). The input device can be configured using, for example, a picture scanner or a digital camera. Alternatively, the biological microscope may be connected to a computer to input a picture directly via a network. The input device 1 sends the read data to the data space coarse-graining device 2.

The data space coarse-graining device 2 constitutes a coarse-grained data space (step A2) based on a first process in which the data space constituted by all the attribute values that each pixel of the picture may take is divided into subspaces with a given resolution, a collection of pixels, each of which takes an attribute value in each subspace, the average of the attribute values of the pixels, and the number of pixels are retained to constitute the coarse-grained space. Here, the data space means the collection of all the attribute values that each pixel of the picture may take. For example, in a standard gray scale picture, the attribute of each pixel may be represented by the intensity, and the intensity is a one-dimensional space usually expressed by an integer from 0 to 255. Moreover, for a standard color picture, it is a three-dimensional space usually represented by integers from 0 to 255 for each color component R, G and B.

In order to constitute the subspace, for example, when the resolution is 8, each value of R, G and B is divided into 8 to constitute an 8×8×8 cube as one subspace. The resolutions along the three-dimensional axes need not be the same. For example, the R-axis may be divided into h1, the G-axis into h2, and the B-axis into h3 for coarse-graining, as long as each subspace does not have overlapping portion, and the entire data space is covered without omission. In the following, the expression "coarse-graining with resolution h" means that each RGB value is divided by h×h×h.

The data space coarse-graining device 2 also holds the collection of the pixels that take values in each subspace, the average of the pixel values, and the number of pixels.

Figure 6:
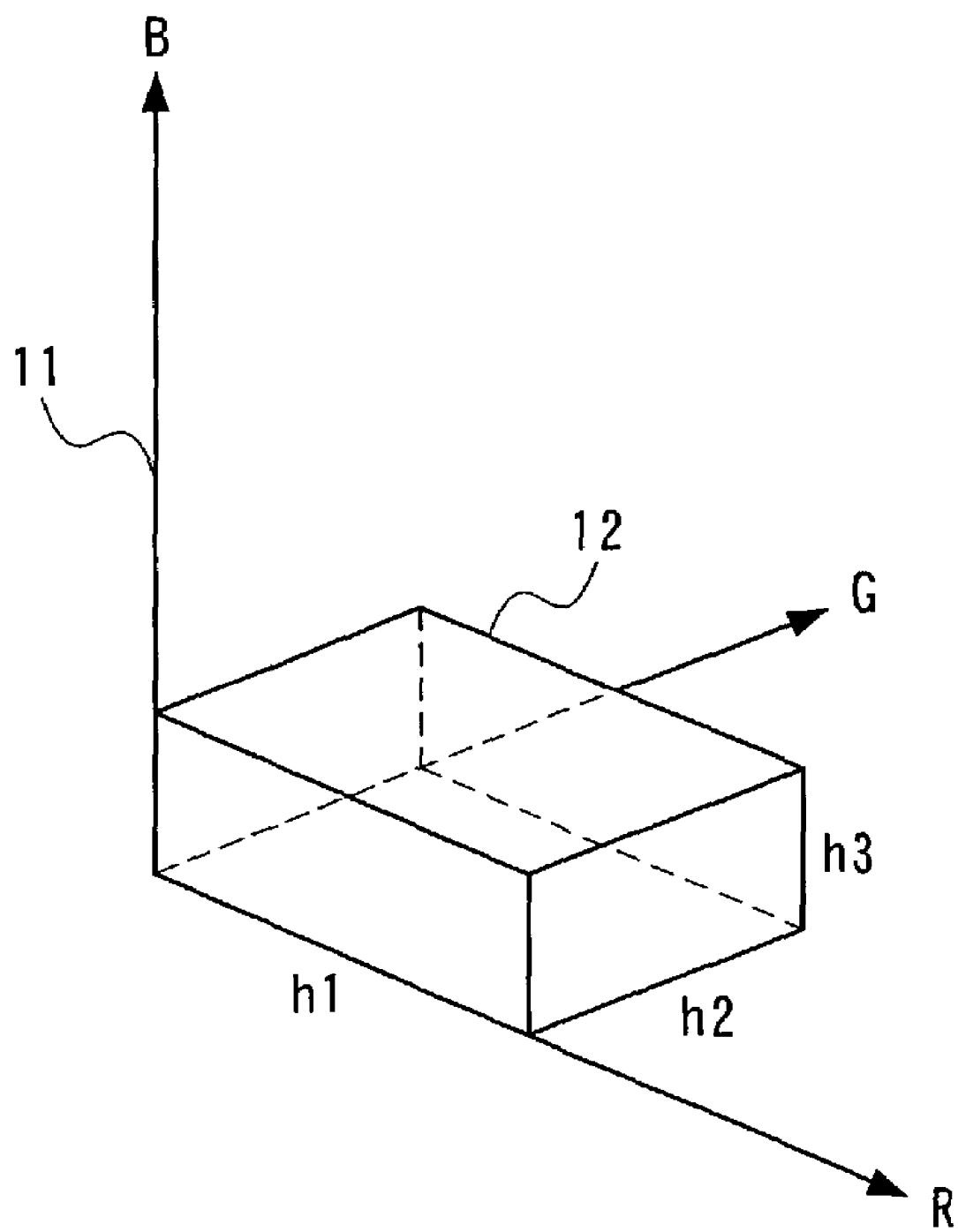
FIG. 6 is a drawing illustrating a shape of coarse-grained data space and the subspace.

FIG. 6 shows a coarse-grained data space 11 in the case where it was coarse-grained with resolution h1×h2×h3, and the subspace 12. For example, when the attribute value $x_j$ of jth pixel is R=128, G=255 and B=18, the pixel takes the value in the subspace specified by the index (16, 31, 2). This is hereinafter expressed as "$x_j$ is included in this subspace".

The data space coarse-graining device 2, after constituting the coarse-grained data space, sends the numbers of the pixels included in each subspace and the pixel count to the coarse-grained empirical probability distribution calculation device 3. The coarse-grained empirical probability distribution calculation device 3 calculates the coarse-grained empirical probability distribution (Step A3) based on a second process in which the number of pixels in each subspace is divided by the total number of pixels contained in the picture to calculate the coarse-grained empirical probability distribution in the coarse-grained data space. Here, coarse-grained empirical probability distribution represents the probability distribution calculated by dividing the observation data included in each subspace of the coarse-grained data space by the total number of pixels.

The coarse-grained empirical probability distribution calculation device 3 sends the coarse-grained empirical probability distribution to the coarse-grained conditional probability distribution calculation device 4. The coarse-grained conditional probability distribution calculation device 4 initializes the class parameter (step A4) based on a third process in which the class parameter, the number of classes, and the mixture ratio of the classes, which define the attributes of each class are initialized. Moreover, the coarse-grained conditional probability distribution calculation device 4 also calculates the coarse-grained conditional probability distribution (Step A5) based on a fourth process in which the conditional probability distribution is calculated under the class being specified from the class parameter that defines the attributes of each class, and the conditional probability distribution under the class being specified is averaged within each subspace to calculate the coarse-grained conditional probability distribution.

The coarse-grained conditional probability distribution is specifically calculated in the following manner. Here, it is assumed that the conditional probability under the condition that the jth pixel value is derived from the ith class is given by the following multidimensional normal distribution:

$$f(x | \phi_i) = \frac{1}{\sqrt{(2\pi)^3 |\Sigma_i|}} \exp\left[-\frac{1}{2}(x-\mu_i)^T \Sigma_i^{-1} (x-\mu_i)\right]$$

expression (15)

where x is a three-dimensional vector consisting of each RGB color value, $\mu_i$ is a three-dimensional vector representing the average color of the ith class, $\Sigma_i$ is a covariance matrix of ith class, and $|\Sigma_i|$ and $\Sigma_i^{-1}$ represent the determinant and the inverse matrix of the matrix $\Sigma_i$ respectively. Moreover, $(x-\mu_i)^T$ represents an inversion.

The coarse-grained conditional probability distribution calculation device 4 calculates the conditional probability with the expression given by Expression (6). In so doing, the measure $m(A_j)$ of each subspace is the volume of each subspace. For example, a uniform coarse-graining with a resolution of 8 results in 8×8×8=512.

When calculating the coarse-grained conditional probability distribution, the coarse-grained conditional probability distribution calculation device 4, may calculate the average value of the data included in each subspace, and calculate the coarse-grained conditional probability distribution in each subspace using the average value. In other words, the coarse-grained conditional probability distribution can be approximated by Expression (13). This method eliminates the need for performing the calculation given by Expression (6) every time when the parameter is updated, thus has the effect of significantly reducing the amount of calculation.

Moreover, the coarse-grained conditional probability distribution calculation device 4 may determine the initial value of the parameter based on the coarse-grained empirical distribution. In other words, each subspace is roughly classified, an average value and a variance value are determined within each class obtained as a result of the classification, and these values serve as initial values for parameter estimation.

Figure 5:
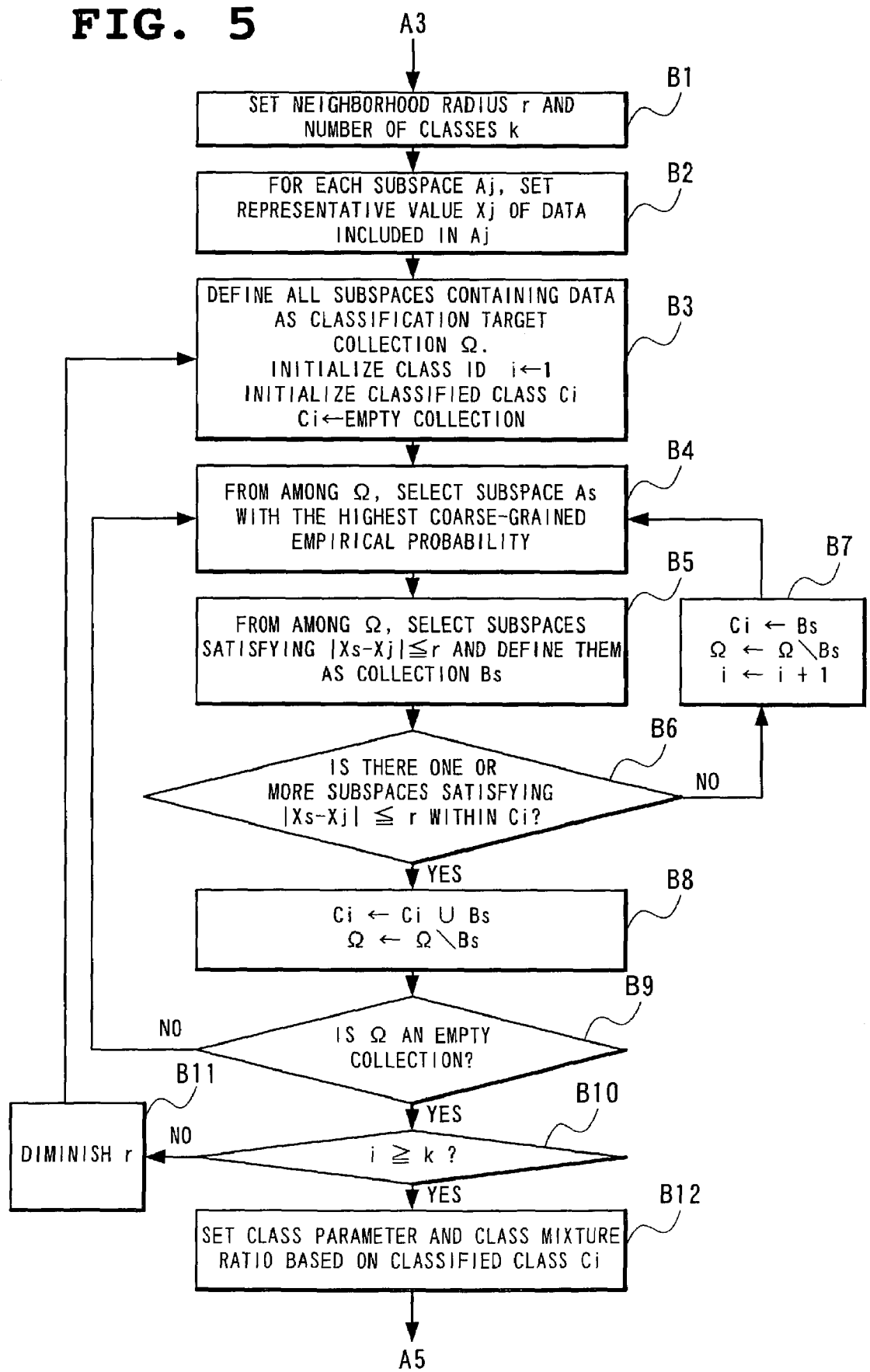
FIG. 5 is a flow chart illustrating the initialization procedure of a parameter in the first embodiment of the present invention.

FIG. 5 is a flow chart illustrating the processing procedure for determining the initial values of the parameters based on the coarse-grained empirical probability distribution. Below, a method for setting the initial value of the parameter will be described with reference to FIG. 5.

First, a neighborhood radius r and the number of classes to be classified k are set in Step B1. The neighborhood radius is used as a reference value to perform a rough classification, assuming that all subspaces within the neighborhood radius belong to the same class. For example, for a color picture, similar color pixels have neighboring RGB values, thus it is considered natural to classify them into the same class.

As described below, although classification is sometimes completed before the desired number of classes is reached when the neighborhood radius is too large, as classification is performed again after the neighborhood radius is diminished, the required number of classes can be obtained eventually. Therefore, the initial value of the neighborhood radius is set to a large enough value, for example, 50. For the number of classes to be classified k, the given value is used as is.

Next, a representative value $X_j$ of each subspace is set for each subspace in Step B2. For example, a median value of the subspace can be used as the representative value of each subspace. Below, the distance between the representative values is taken as the distance between subspaces.

Next, a collection of subspaces is set which are to be subjected to classification (Step B3). The collection is hereinafter referred as to $\Omega$. The initial value of $\Omega$ is a collection consisting of the entire subspace including the data. Moreover, the number of classified classes i is set to 1, and the initial value of the classified class $C_i$ is an empty collection.

Next, the subspace with the highest coarse-grained empirical probability is selected among the subspaces belonging to $\Omega$ (Step B4). The subspace is referred to as $A_s$. Next, the distances between the subspaces belonging to $\Omega$ and $A_s$ are examined, all the subspace within the neighborhood radius r are selected and defined as a neighborhood collection (Step B5). The neighborhood collection is hereinafter referred to as $B_s$.

Next, the shortest distance between the subspace included in the class $C_i$ for which the classification has been already completed, and the subspace included in the neighborhood set $B_s$ is determined to examine whether it is larger than the neighborhood radius r or not (step B6). If the shortest distance is larger than r, the neighborhood collection $B_s$ may be considered as a new class because it has an attribute different enough from the class for which the classification has been already completed, and occurs with a high probability. Therefore, the neighborhood collection $B_s$ is directly adopted as a new class.

Since the classification of $B_s$ is completed, it is deleted from the classification target collection $\Omega$. The deletion is expressed as "$\Omega \leftarrow \Omega \backslash B_s$", using symbols in FIG. 5. After the update of $\Omega$, the process returns to Step B4 (Step B7).

If the shortest distance between the subspace included in the class $C_i$ for which the classification has been already completed, and the substance included in the neighborhood collection $B_s$ is shorter than the neighborhood radius r, the neighborhood collection $B_s$ may be considered to have an attribute close to $C_i$, so that $B_s$ is integrated into $C_i$. Since classification of $B_l$ is completed, it is deleted from the classification target collection $\Omega$ (Step B8).

Next, whether $\Omega$ is an empty collection or not is examined (Step B9), if it is not an empty collection, the process goes to Step B4, if it is an empty collection, whether the number of classes for which the classification has already been completed is k or more is examined (Step B10), and if it is k or less, the radius is diminished by multiplying the neighborhood radius r by a constant of less than 1. A value such as 0.9 can be used as the constant. Thereafter, Steps B3 and later are repeated.

If $\Omega$ is an empty collection, and the number of classified classes is greater than a given number, the desired number of classes have been classified, so that a class parameter is calculated within each class and taken as the initial value of the class parameter, also, the ratio of the number of subspaces included in each class is taken as the initial value of the class mixture ratio (Step B12).

FIGS. 7A, 7B, 7C, 7D, 7E, 7F, 7G, and 7H are drawings illustrating simple examples to facilitate understanding the procedure of initial value setting that determines the initial value of a parameter based on the coarse-grained empirical probability distribution shown in FIG. 5. In FIGS. 7A, 7B, 7C, 7D, 7E, 7F, 7G, and 7H, it is assumed that the data space is one dimensional and divided into a total of 10 subspaces. Below, the procedure of initial value setting will be described with reference to FIGS. 7A, 7B, 7C, 7D, 7E, 7F, 7G, and 7H.

Figure 7A:
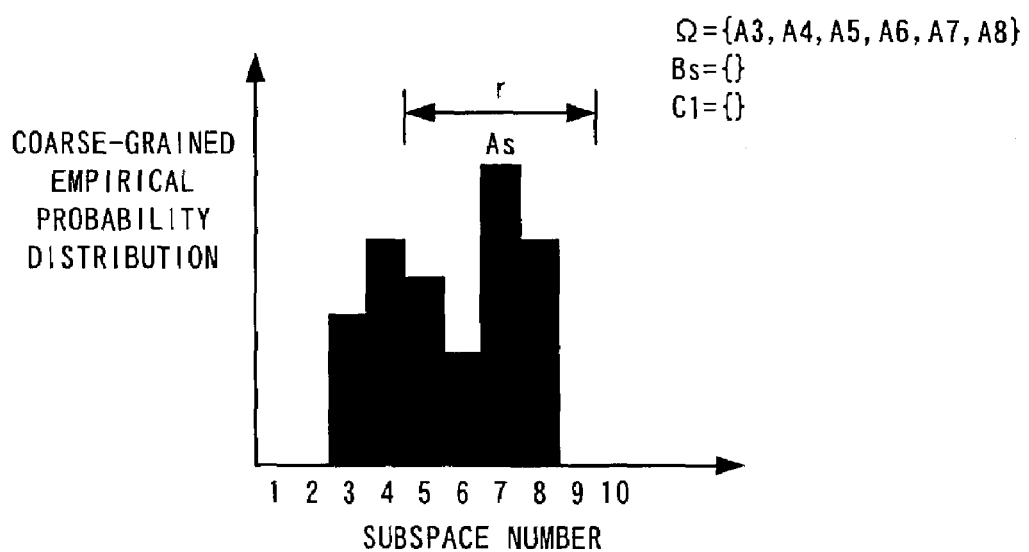
FIG. 7A is a drawing illustrating an example of a method for initializing a parameter of the present invention.

In FIG. 7A, the horizontal axis represents the subspace number, and the vertical axis represents the coarse-grained empirical probability distribution. In the following, to focus on an intuitive description of the process flow, the coarse-grained empirical probability value, the representative value of the subspace, and the neighborhood radius will be illustrated without using specific numeric values.

First, for example, the number of classes is set to 2, and the neighborhood radius is defined as r in Step B1. The representative value of each subspace is set in Step 2. Since the initial value of classification target collection $\Omega$ is the whole subspace including data in Step B3, $\Omega = \{A3, A4, A5, A6, A7, A8\}$ is obtained. A1, A2, A9, and A10 are not included in the classification target collection because the coarse-grained probability is 0, that is, the data included in these subspaces have not been observed.

Figure 7B:
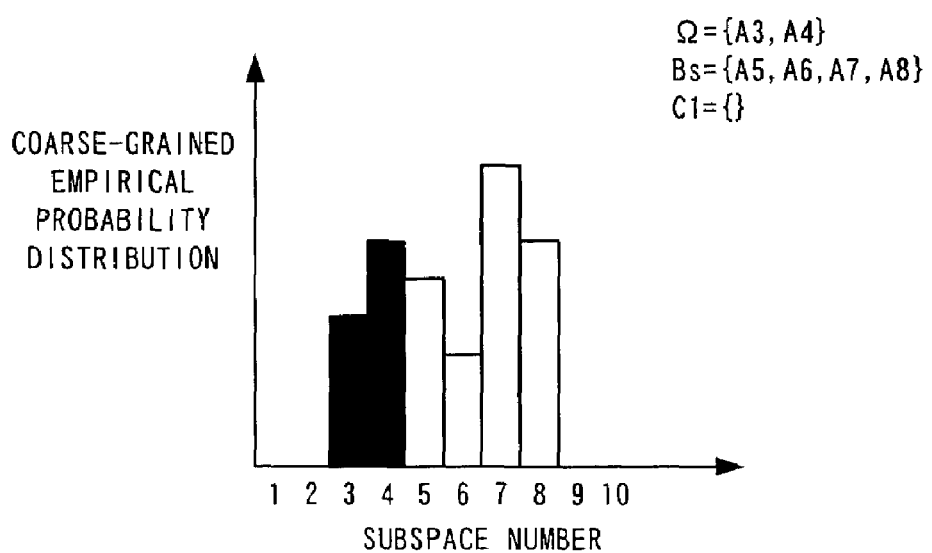
FIG. 7B is a drawing illustrating an example of a method for initializing a parameter of the present invention.

In Step B4, A7, which has the highest coarse-grained empirical probability, is selected among the subspaces included in the classification target collection, and it is defined as $A_s$ (FIG. 7A). In Step B5, the subspaces within the neighborhood radius r from A7 are selected and defined as $B_s$. Since the subspaces within the neighborhood radius shown in FIG. 7A are A5, A6, A7, and A8, $B_s=\{A5, A6, A7, A8\}$ is obtained (FIG. 7B).

In Step B6, since there is no classified class yet, $B_s$ is directly used as a first class C1, $B_s$ is removed from the classification target collection, and the process returns to Step B4. In FIG. 7B, the empty bars showing the levels of coarse-grained empirical probability indicates the fact that the subspaces were removed from the classification target collection.

Figure 7C:
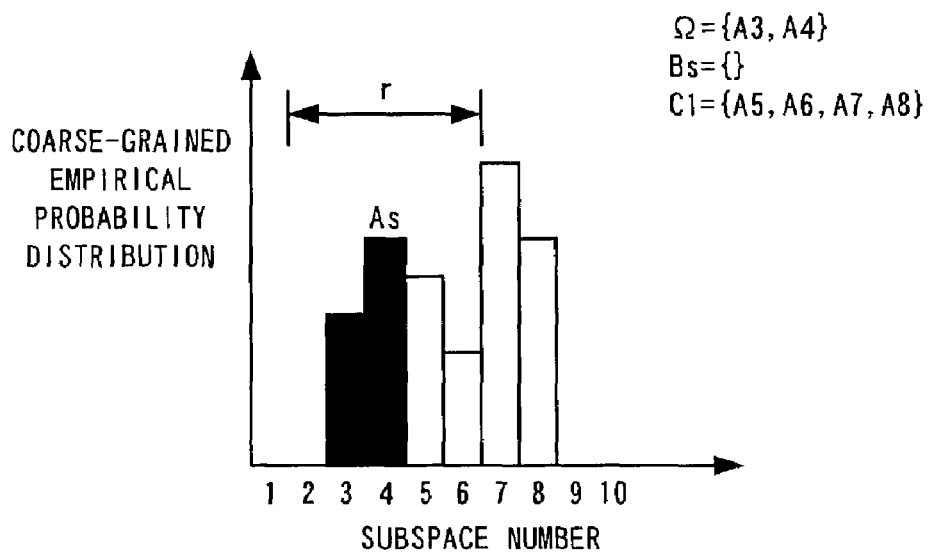
FIG. 7C is a drawing illustrating an example of a method for initializing a parameter of the present invention.

In Step B4, since A4 has the highest coarse-grained empirical probability of the remaining classification target collection, this is newly defined as $A_s$ (FIG. 7C). In Step B5, the subspaces within the neighborhood radius r from A4 are selected and defined as $B_s$. Thus, $B_s=\{A3, A4\}$ is obtained.

Figure 7D:
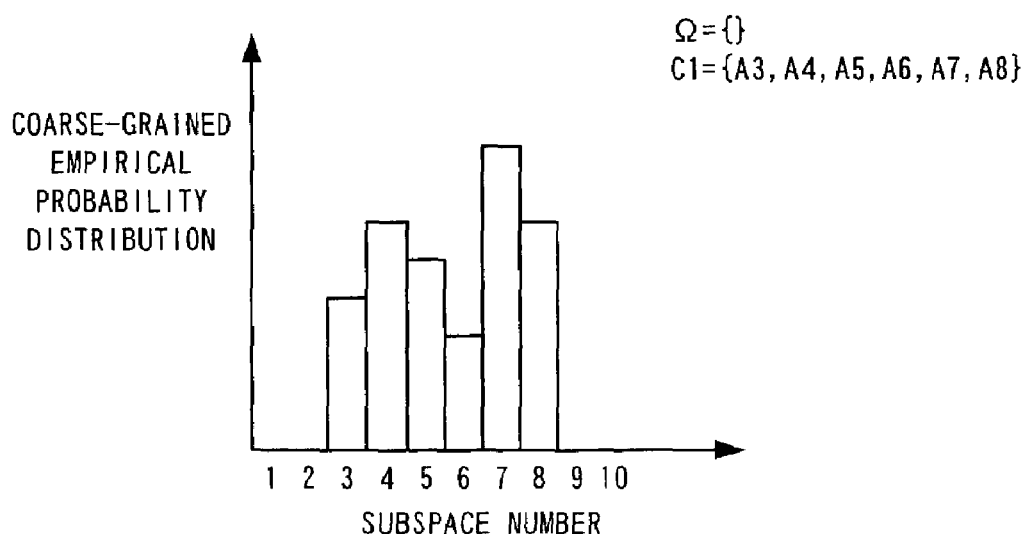
FIG. 7D is a drawing illustrating an example of a method for initializing a parameter of the present invention.
Figure 7E:
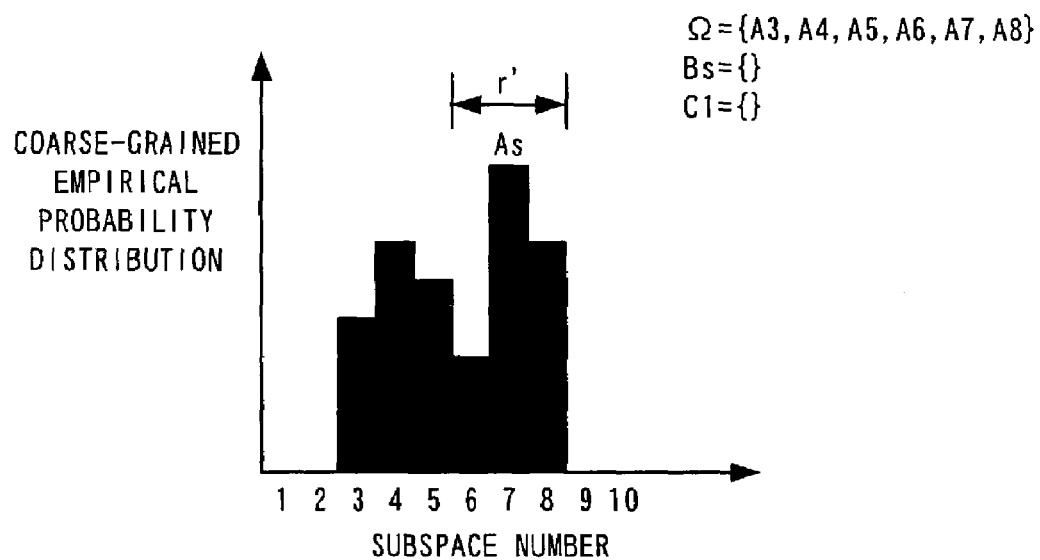
FIG. 7E is a drawing illustrating an example of a method for initializing a parameter of the present invention.

In Step B6, when the classified class, that is,

C1={A5, A6, A7, A8} is examined, it includes A5 and A6, which are within the neighborhood radius r from A4. Therefore, the current $B_s$ is integrated into the classified class C1 (FIG. 7D).

Although the classification target collection Ω becomes empty, and classification of all the subspaces is completed, the number of classified classes is 1, which comes short of the desired number of classes 2 (step B10). Therefore, the neighborhood radius is diminished (step 11), and Steps B3 and later are repeated.

Figure 7F:
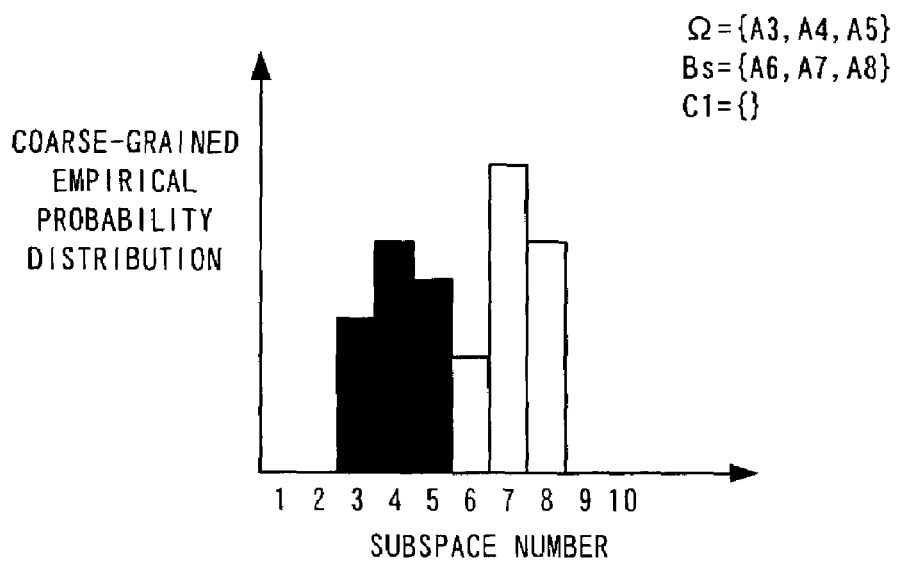
FIG. 7F is a drawing illustrating an example of a method for initializing a parameter of the present invention.

Below, the diminished radius is set to r' (FIG. 7E), and a procedure similar to the above is repeated. However, since this time the neighborhood radius is diminished, the following difference occurs. That is, this time, the subspaces within the neighborhood radius r' of A7 are $B_s=\{A6, A7, A8\}$ (FIG. 7F).

Figure 7G:
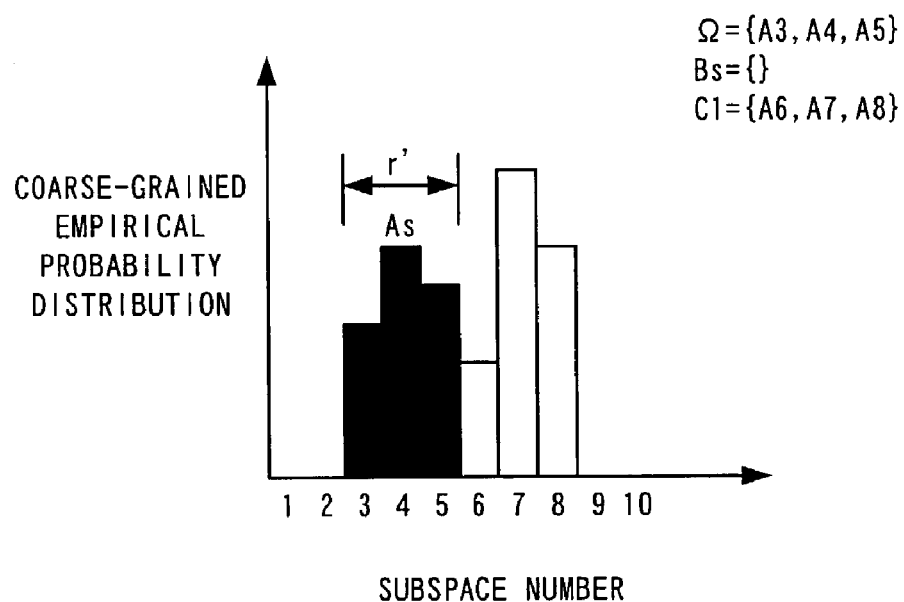
FIG. 7G is a drawing illustrating an example of a method for initializing a parameter of the present invention.

$B_s$ is directly used as the first class C1, and A4, which has the highest coarse-grained empirical probability, is selected among the remaining classification target collection (FIG. 7G). The subspaces within the neighborhood radius r' from A4 are $B_s=\{A3, A4, A5\}$.

Figure 7H:
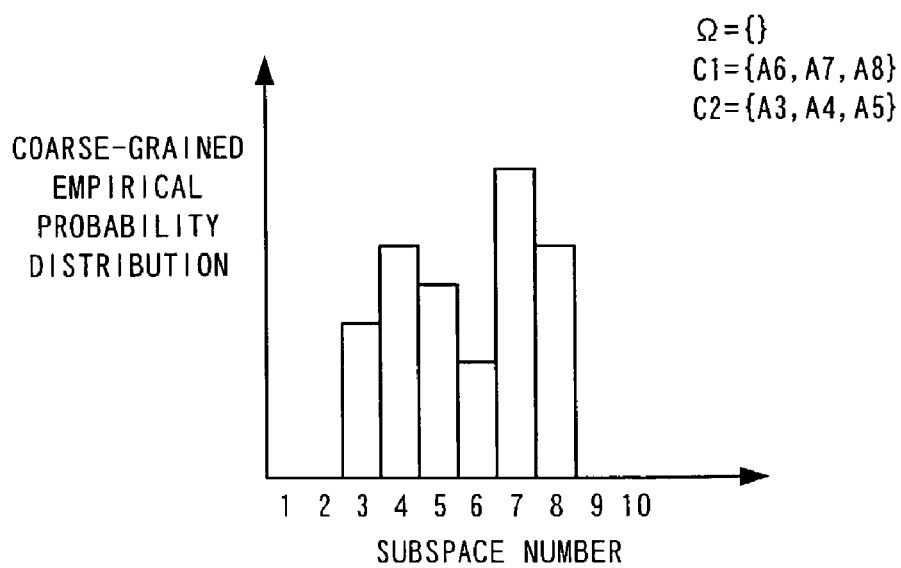
FIG. 7H is a drawing illustrating an example of a method for initializing a parameter of the present invention.

This time, since there is no subspace within the neighborhood radius r' from A4 in the classified class C1, the current $B_s$ is adopted as a new class C2 (FIG. 7H). Thus, all the subspaces are classified into desired two classes.

After the rough classification is completed, averages and variances are determined within the classified classes to be used as initial parameters for subsequent estimation. To properly set the initial parameter is effective in preventing falling into a local optimal solution in the process of maximization of the coarse-grained log-likelihood.

The coarse-grained conditional probability distribution calculation device 4 can determine the coarse-grained conditional probability distribution by using the parameter determined as described above as the initial value. The coarse-grained conditional probability distribution calculation device 4 sends the determined coarse-grained conditional probability distribution to the class membership probability calculation device 5. The class membership probability calculation device 5 calculates the class membership probability using Expression (11) (Step A6) based on a fifth process in which the class membership probability which is the probability that each pixel constituting a picture belongs to each class is calculated by multiplying a class mixture ratio by the coarse-grained conditional probability distribution.

The class membership probability represents the probability that a pixel included in the jth subspace belongs to the ith class. Therefore, region extraction can be performed easily by calculating the class membership probability for each pixel on the picture, and classifying each pixel into the class that has a high probability. The class membership probability calculation device 5 sends the calculated class membership probability to the parameter update device 6.

The parameter update device 6 updates the parameter so as to maximize Expression (9) based on a sixth process in which the class parameter and the class mixture ratio are updated so as to increase an evaluation function. Specifically, the parameter is updated in the following manner.

$$w_i = \sum_{j=1}^{N} \tilde{q}_j \tilde{\pi}_{ij} \quad \text{expression (16)}$$

$$\mu_i = \frac{\sum_{j=1}^{N} \tilde{q}_j \tilde{\pi}_{ij} \tilde{x}_j}{\sum_{j=1}^{N} \tilde{q}_j \tilde{\pi}_{ij}} \quad \text{expression (17)}$$

$$\sum_i = \frac{\sum_{j=1}^{N} \tilde{q}_j \tilde{\pi}_{ij} (\tilde{x}_j - \mu_i) \otimes (\tilde{x}_j - \mu_i)^T}{\sum_{j=1}^{N} \tilde{q}_j \tilde{\pi}_{ij}} \quad \text{expression (18)}$$

where $u \otimes v^T$ represents a matrix having the product $u_i v_j$ of the i component and j component of vectors u and v as the ij component. Moreover, $\tilde{x}_j$ represents the average value of data included in the jth subspace $A_j$ defined by Expression (14).

As described before, by updating the parameter in the above manner, the coarse-grained complete log-likelihood given by Expression (9) increases, thus the coarse-grained average log-likelihood given by Expression (12) also increases. This is described in detail in Document 2. After the parameter is updated, the parameter update device 6 sends the updated parameter to the evaluation function calculation device 7. The evaluation function calculation device 7 calculates the coarse-grained log-likelihood (Step A8) using Expression (12) according to a seventh process in which the coarse-grained log-likelihood is calculated as the evaluation function using the coarse-grained conditional probability distribution.

Instead of the coarse-grained log-likelihood, the evaluation function AIC $L_{AIC} = -2n\tilde{L} + 2m$ \quad expression (19)

may also be used to use an evaluation function in which the lower the AIC, the better the estimated result. Here, it indicates the total number of parameters. AIC is proportional to the amount of coarse-grained log-likelihood multiplied by a minus sign, so that AIC varies in the direction of reduction by the update performed by the parameter modification device 6. Moreover, since a term proportional to the parameter is added, if the same coarse-grained log-likelihood is used, the estimated result obtained by using the model with fewer parameters is better. Using the evaluation function, excessive adaptation to the data is prevented, thus, making it possible to perform estimations that are resistant to noise.

Moreover, the evaluation function MDL defined by the following expression:

$$L_{MDL} = -n\tilde{L} + \frac{m}{2}\log n \qquad \text{expression (20)}$$

may be used to obtain similar results.

Furthermore, the Structural Risk $$L_{SRM} = \frac{\tilde{L}}{1 - c\sqrt{a_1 \frac{h(\ln a_2 n/h + 1) - \ln(\eta/4)}{n}}} \qquad \text{expression (21)}$$

may be used to obtain similar results. Here, η indicates that Expression (21) holds for probability η, and usually a value such as 0.01 is used. Symbols c, a1 and a2 are constants determined by the properties of probability distribution, and, for example, the values c=1, a1=1 and a2=1 are used. The symbol h is called a VC dimension, and it is a quantity that is proportional to the number of parameters.

The evaluation function calculation device 7 examines whether a change in the evaluation function satisfies a given termination condition or not; if the termination condition is satisfied, it send the current parameter to the region extraction device 8, and if the termination condition is not satisfied, it sends the current parameter to the coarse-grained conditional probability distribution calculation device 4 (step A9). For example, the condition such as whether the absolute value of the value obtained from the difference between the value of the evaluation function at the current time and the value of the evaluation function calculated the previous time, divided by the value of the evaluation function value at the current time is 0.0001 or less may be used as the termination condition.

The region extraction device 8 receives the parameter from the evaluation function calculation device 7, and extracts the region using the information on the parameter (Step A10). For example, to extract the region belonging to the ith class, the value of the coarse-grained class membership probability obtained by Expression (11) is examined from j=1 to j=N, and the subspaces with a probability that is not less than a certain value (threshold) is defined as subspaces belonging to the ith class. Next, the pixels included in the subspace are examined, and these pixels are extracted as being from the ith region. The desired result can be obtained using the threshold of e.g. 0.5 for the class membership probability.

The region extraction device 8 may also automatically set the threshold. To do so, the following is performed. To extract the ith region, first, the estimated class mixture ratio $w_i$ is multiplied by the total number of pixels to determine the estimated value of the number of pixels belonging to each class. The number is defined as $n_i$.

Next, the coarse-grained class membership probability given by Expression (11) is examined from j=1 to j=N, and the pixels included in the subspace are extracted in decreasing order of subspace values, then this process is repeated until the extracted pixels reaches $n_i$. If the $n_i$th extracted pixel number is set to 1, the value of the coarse-grained class membership probability given by Expression (11) becomes the threshold of the probability that a pixel belongs to the ith region. After completing region extraction, the region extraction device 8 sends the data on the extracted region to an output device 9.

The data space coarse-graining device 2, the coarse-grained empirical probability distribution calculation device 3, the coarse-grained conditional probability distribution calculation device 4, the class membership probability calculation device 5, the parameter update device 6, the evaluation function calculation device 7, and the region extraction device 8 as described above can be built using calculators such as, for example, a personal computer, a workstation, or a super computer. The output device 9 receives the region data from the region extraction device 8, and delivers it (Step A11). The output device 9 can be constituted using, for example, a display, a printer and such.

Figure 3:
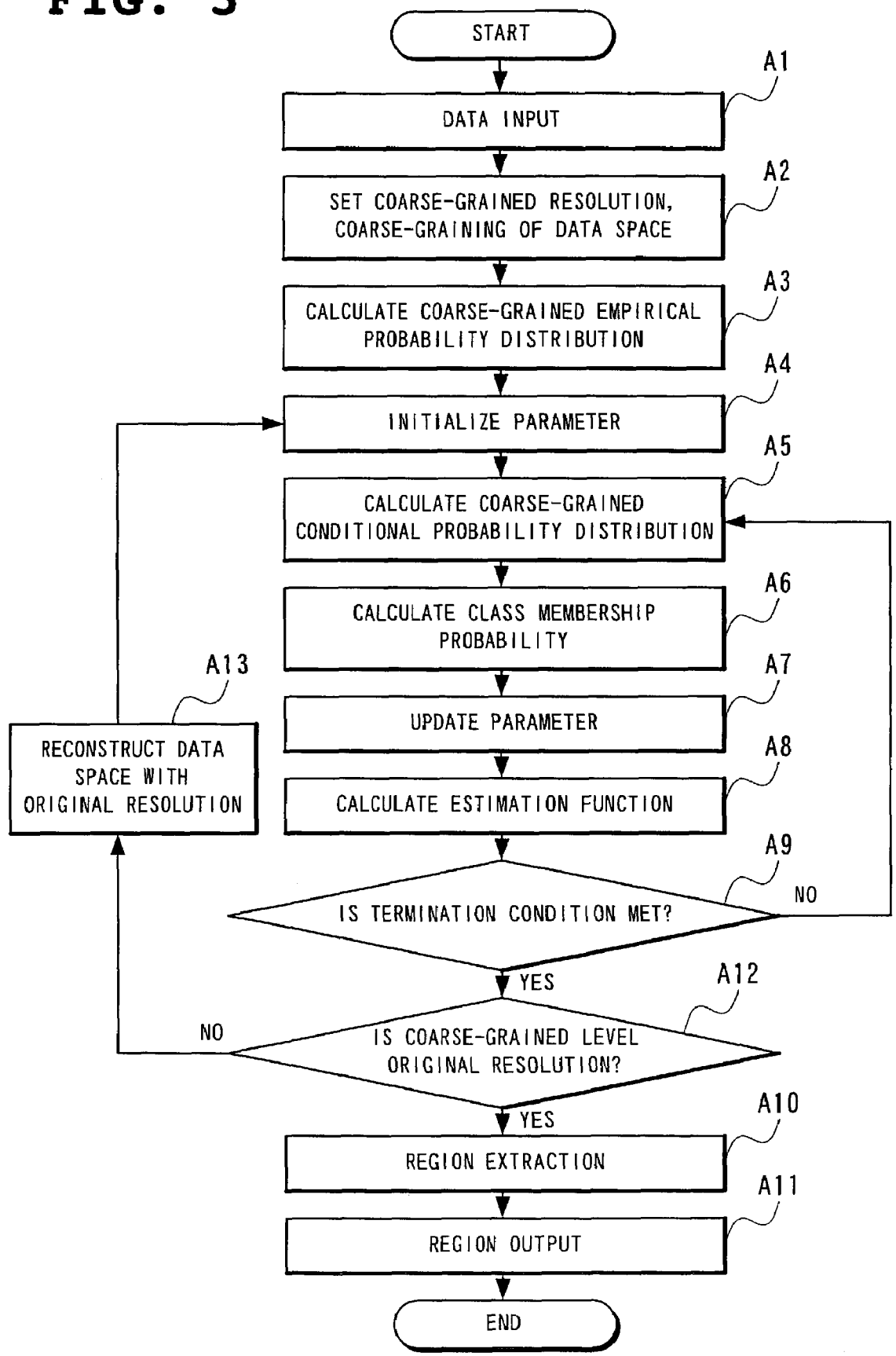
FIG. 3 is a flow chart illustrating the processing procedure in a second embodiment of the present invention.
Figure 4:
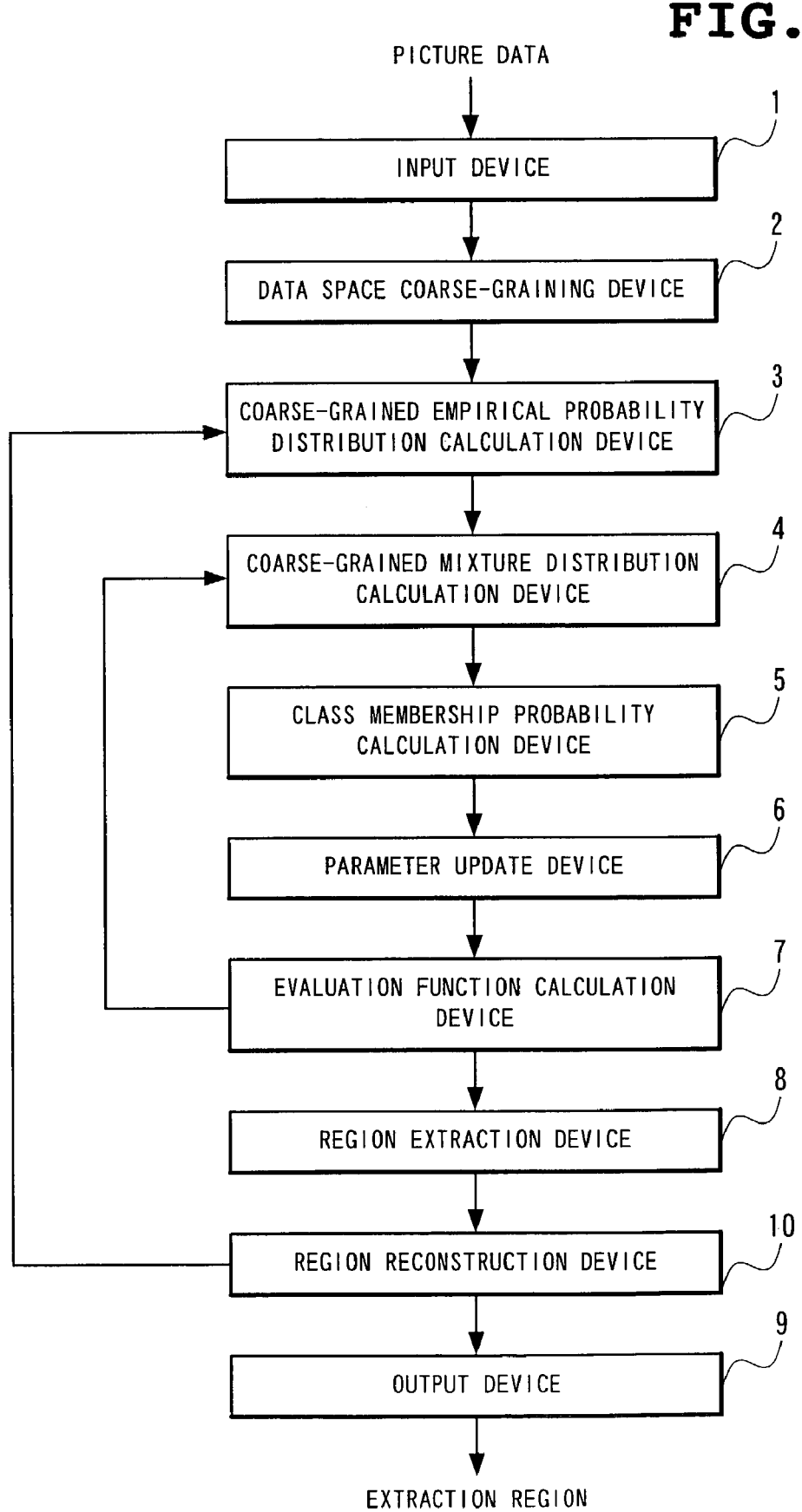
FIG. 4 is a block diagram illustrating the configuration of a picture region extraction device in the second embodiment of the present invention.

FIG. 3 is a flow chart illustrating the processing procedure in a picture region extraction method of a second embodiment of the present invention. Moreover, FIG. 4 is a block diagram illustrating the configuration of a picture region extraction device of the present embodiment. The present embodiment is characterized by the addition of a region reconstruction device 10 to the first embodiment. Therefore, the portion of the description overlapping with the first embodiment will be omitted in the following description.

After the parameter estimation is completed using the coarse-grained probability distribution, the region reconstruction device 10 examines whether the coarse-grained resolution is equal to the original resolution or not (step A12), and reverts the data to the original resolution if coarse-graining has been performed (Step A13). If the coarse-graining has not been performed, it means that the estimation with the original resolution is completed, so that the region reconstruction device 10 sends the parameter estimated with the original resolution to the region extraction device 8.

To revert the data to the original resolution, the coarse-grained resolution is set to the minimum unit of data attribute value (such as 1), and the exact same method as described in the first embodiment may be repeated. In this case, although longer time is required for estimation than the method described in the first embodiment, the parameter can be estimated with higher accuracy, thus allowing a region extraction with higher accuracy. Moreover, since the estimated parameter using the coarse-grained probability distribution is already estimated so as to be close to the optimal parameter, the optimal parameter can be estimated with fewer number of parameter updates than in case where estimation is performed with high resolution from the beginning, thus allowing region extraction at much higher speed.

Next, the result of the assessment of the efficiency of the present invention will be described using simulation data.

Figure 8:
FIG. 8 shows an example of a picture for which the present invention is suitable.

FIG. 8 is a picture that simulates a micrograph of cells, which consists of a glandular cavity (the brightest region in the picture), cell nuclei (small circular organizations with low intensity which are present around the glandular cavity), and other organizations. This is a monochrome picture in this document, however, it is actually a color picture with the glandular cavity being light pink, the cell nuclei being dark lavender, and the other region being amaranth.

The object here is to separate and extract the glandular cavity region and the cell nuclei regions from the picture. The shape of the extracted glandular cavity, and the density and the size of the extracted cell nuclei can be used, for example, to determine whether cells are cancerous or not. However, as can be seen in FIG. 8, the regions corresponding to the cell nuclei are difficult to distinguish from the background, and with a conventional method, it is difficult to extract only the cell nuclei automatically.

Extraction of the glandular cavity region and the cell nuclei regions was attempted on the picture using the technique described in the present invention. The estimation is performed here assuming that the coarse-grained resolution is 16×16×16, and the number of classes is 3. The number of classes is set to 3 because the picture is expected to be divided into the regions corresponding to the cell nuclei (Class 1), the region corresponding to the glandular cavity (Class 2), and the other regions (Class 3).

Figure 9A:
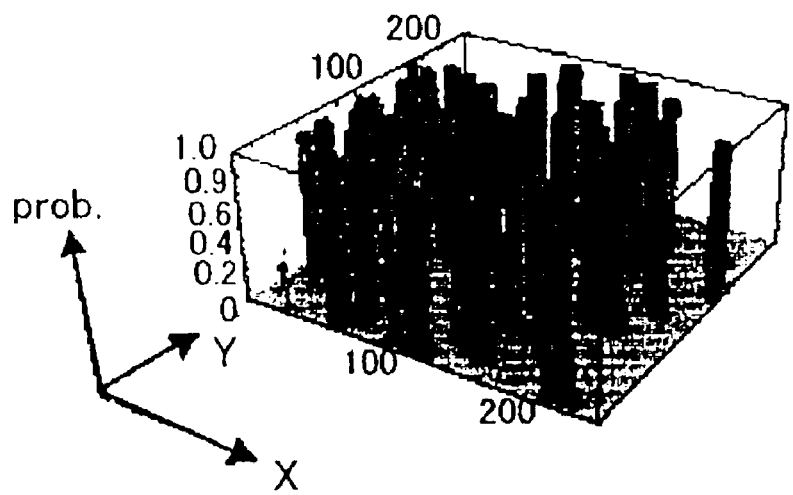
FIG. 9A shows the result obtained by performing a picture region extraction using the present invention with coarse-grained resolution 16, which is a three-dimensional representation of class membership probability distribution belonging to Class 1 (cell nuclei region)
Figure 9B:
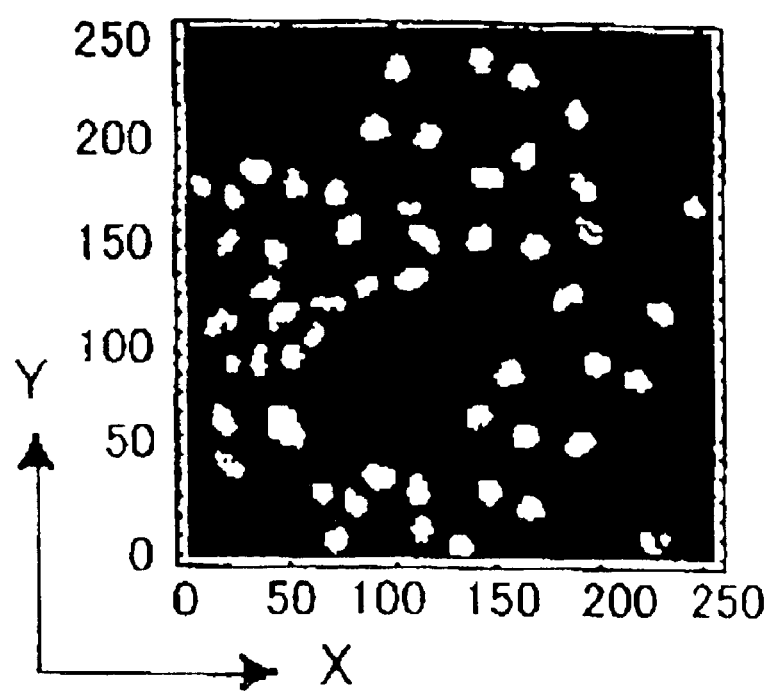
FIG. 9B shows the result obtained by performing the picture region extraction using the present invention with the coarse-grained resolution 16, which is a two-dimensional representation of the class membership probability distribution belonging to Class 1 (cell nuclei region)

The estimated results obtained as above are shown in FIGS. 9A, 9B, 9C, and 9D. FIG. 9A shows three-dimensionally the class membership probability of Class 1 (cell nuclei regions), in which the x-axis and the y-axis indicate the pixel position, and the z-axis represents membership probability values. FIG. 9B shows two-dimensionally the membership probability to Class 1 using gray scale, in which the lower the probability that a pixel belongs to Class 1, the darker the pixel, the higher the probability, the brighter the pixel.

Figure 9C:
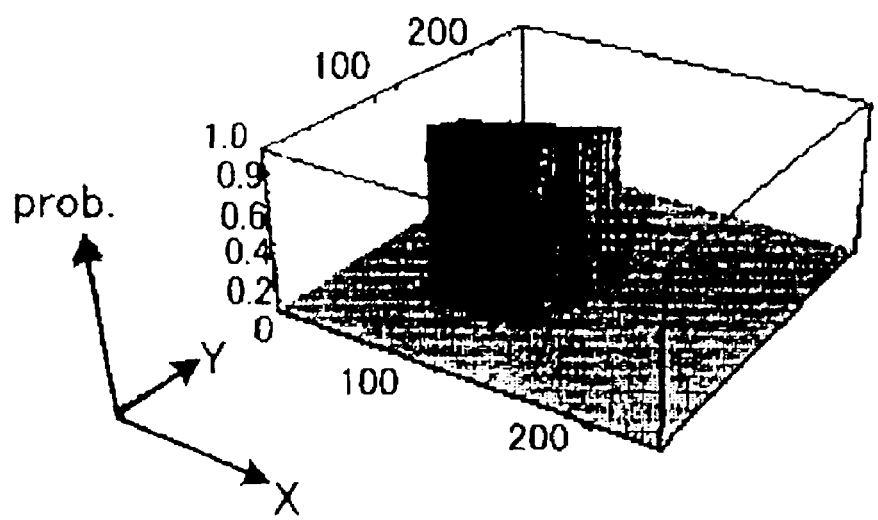
FIG. 9C shows the result obtained by performing the picture region extraction using the present invention with the coarse-grained resolution 16, which is a three-dimensional representation of class membership probability distribution belonging to Class 2 (glandular cavity region)
Figure 9D:
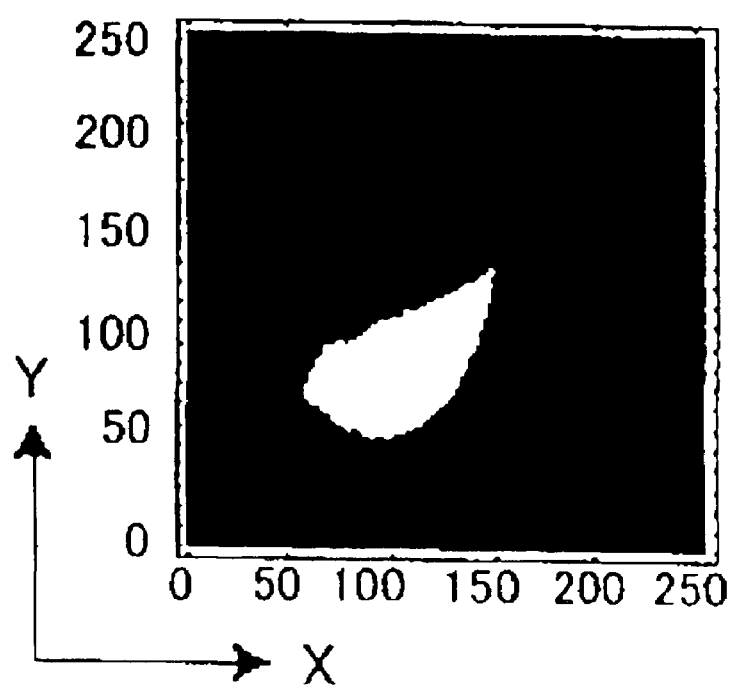
FIG. 9D shows the result obtained by performing the picture region extraction using the present invention with the coarse-grained resolution 16, which is a two-dimensional representation of the class membership probability distribution belonging to Class 2 (glandular cavity region)

Similarly, FIGS. 9C and 9D show respectively the class membership probability to Class 2 (glandular cavity) three-dimensionally and two-dimensionally, and it is clear that the portion with a high membership probability have pixels belonging to the glandular cavity region (since Class 3 is not an extraction target, the results concerning Class 3 is omitted here). These results can be automatically obtained without explicitly setting the threshold, and region extraction is possible by only examining the distribution of membership probability to each class.

Figure 10A:
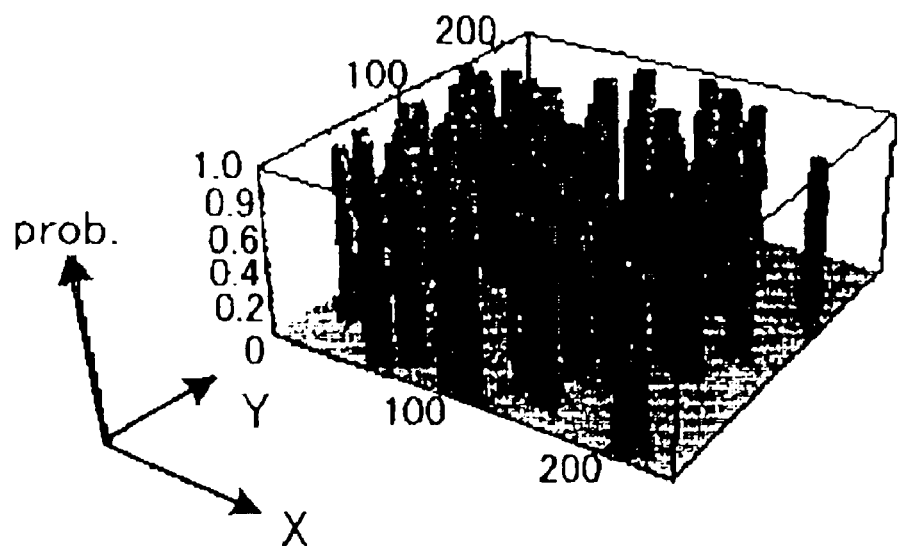
FIG. 10A shows the result obtained by performing the picture region extraction using the present invention with no coarse-graining (coarse-grained resolution 1), which is a three-dimensional representation of class membership probability distribution belonging to Class 1 (cell nuclei region)
Figure 10B:
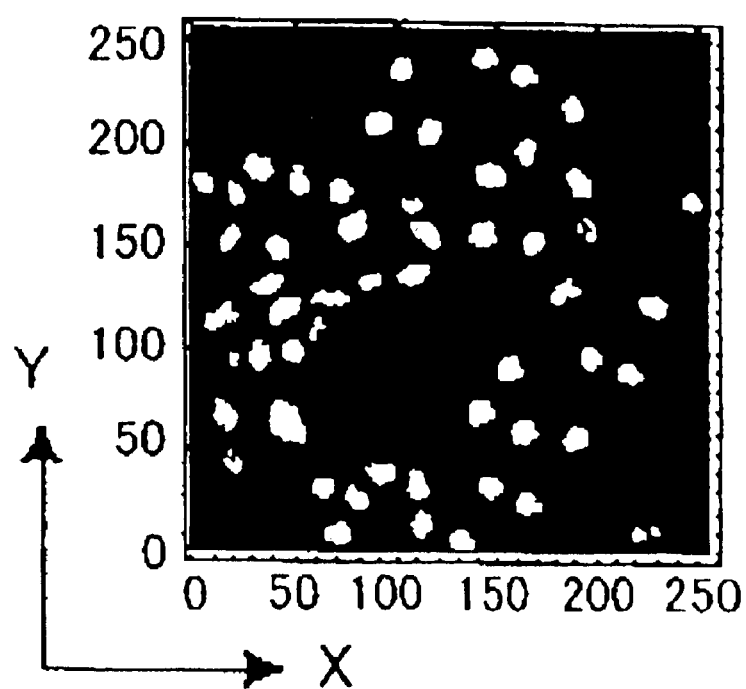
FIG. 10B shows the result obtained by performing the picture region extraction using the present invention with no coarse-graining (coarse-grained resolution 1), which is a two-dimensional representation of the class membership probability distribution belonging to Class 1 (cell nuclei region) respectively.
Figure 10C:
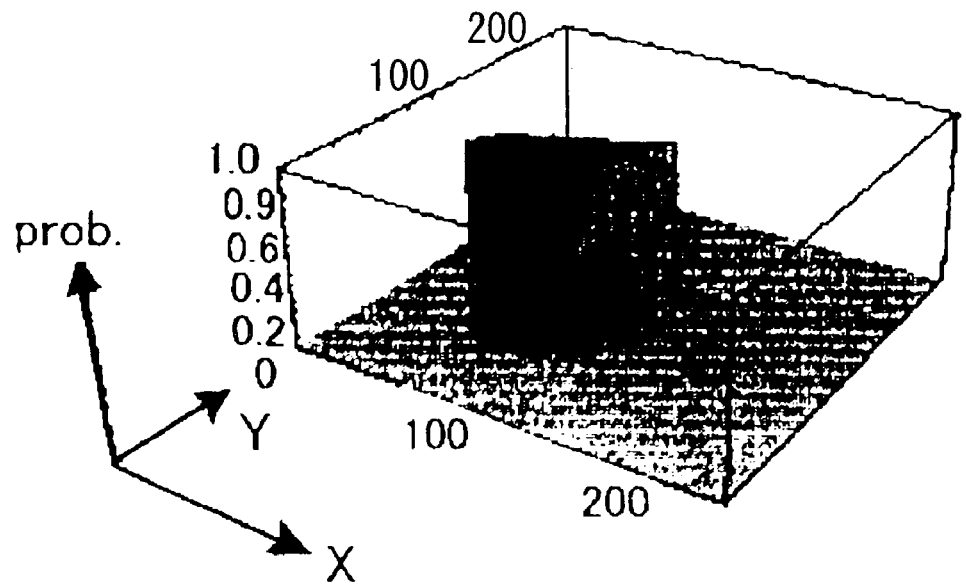
FIG. 10C shows the result obtained by performing the picture region extraction using the present invention with no coarse-graining (coarse-grained resolution 1), which is a three-dimensional representation of class membership probability distribution belonging to Class 2 (glandular cavity region) respectively.
Figure 10D:
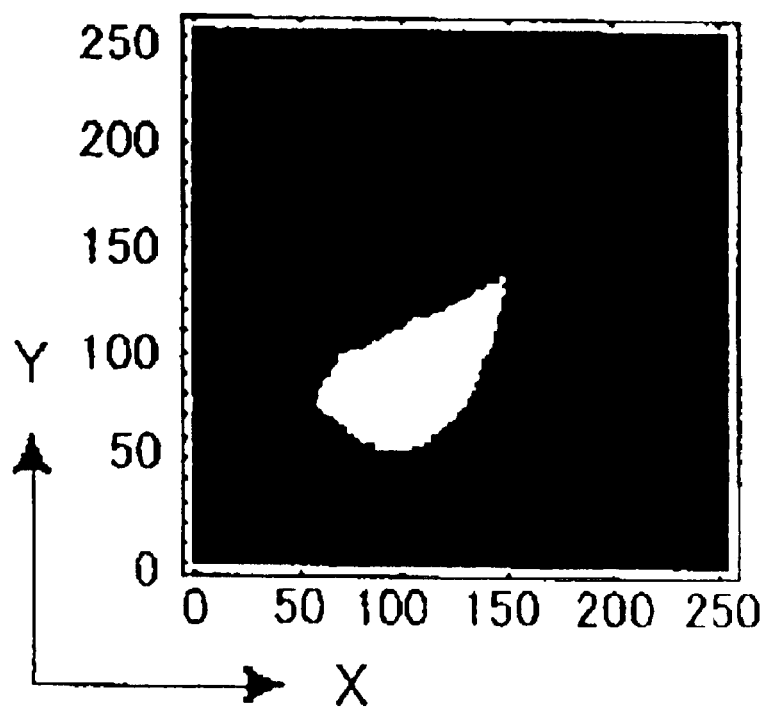
FIG. 10D shows the result obtained by performing the picture region extraction using the present invention with no coarse-graining (coarse-grained resolution 1), which is a two-dimensional representation of the class membership probability distribution belonging to Class 2 (glandular cavity region)

The results of the same estimation performed without coarse-graining (coarse-grained resolution 1) are shown in FIGS. 10A, 10B, 10C, and 10D. FIGS. 10A and 10B show respectively the class membership probability to the class 1 three-dimensionally and two-dimensionally, and FIGS. 10C and 10D show respectively the class membership probability to the class 2 three-dimensionally and two-dimensionally. It is clear from these drawings that the estimation results with coarse-grained resolution 16 and without coarse-graining are almost identical.

Comparing with the estimated parameter values, for example, the average RGB value in the region belonging to Class 1 is RGB=(143.068, 86.689, 135.737) for the estimation without coarse-graining, and RGB=(141.522, 86.128, 135.513) for the estimation with resolution 16; thus, there is almost no effect due to coarse-graining.

Figure 11:
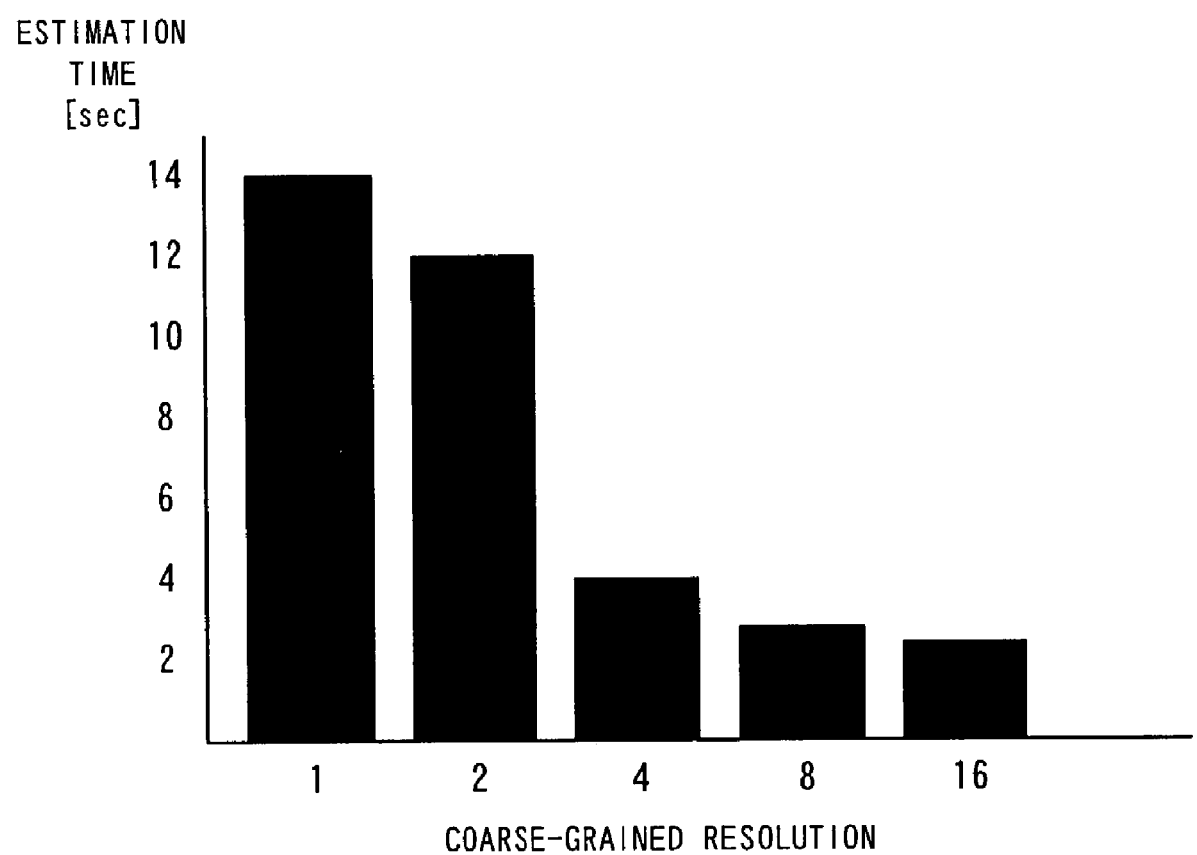
FIG. 11 is a chart illustrating estimation time in the cases where the picture region extraction using the present invention is performed with coarse-grained resolutions 1, 2, 4, 8, and 16.

However, significant difference in the estimation time exists depending on whether coarse-graining is applied or not. To examine the difference, a chart that compares the estimation times with various coarse-grained resolutions is shown in FIG. 11. The chart shows that the estimation time in case estimation was performed with coarse-grained resolution 16 is one-seventh the time in case estimation was performed without coarse-graining.

As described above, the present invention automatically extracts a desired region from picture data without explicitly setting a threshold, by performing region extraction based on class membership probability. Moreover, by using coarse-grained probability distribution, region extraction can be performed at higher speed than in conventional examples.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A picture region extraction method, which extracts a desired region from picture data containing an image to be subjected to region extraction by classifying each pixel on the picture into a plurality of classes, comprising:

a first step in which the data space constituted by all the attribute values that may be taken by said each pixel on said picture is divided into subspaces with a given resolution, a collection of pixels, each of which takes an attribute value in said each subspace, the average of the attribute values of said pixels, and the number of said pixels are retained to constitute a coarse-grained space;

a second step in which the number of pixels in said each subspace is divided by the total number of pixels contained in said picture to calculate the coarse-grained empirical probability distribution in the coarse-grained data space;

a third step in which the class parameter, the number of said classes, and the mixture ratio of said classes, which define the attributes of said each class, are initialized;

a fourth step in which a conditional probability distribution under said class being specified is calculated from the class parameter that defines the attributes of said each class, and the conditional probability distribution under said class being specified is averaged within said each subspace to calculate a coarse-grained conditional probability distribution;

a fifth step in which a class membership probability, which is the probability that each pixel constituting said picture belongs to said each class, is calculated by multiplying said class mixture ratio by said coarse-grained conditional probability distribution;

a sixth step in which said class parameter and said class mixture ratio are updated so as to increase an evaluation function;

a seventh step in which a coarse-grained log-likelihood is calculated as said evaluation function using said coarse-grained conditional probability distribution;

an eighth step in which whether said evaluation function satisfies a given termination condition or not is examined; and a ninth step in which after said evaluation function satisfies said given termination condition, said class parameter and said class mixture ratio are retained, and the region each pixel belongs to is determined based on said class membership probability to extract said desired region, said fourth, fifth, sixth, seventh and eighth steps being repeated until said evaluation function satisfies said given condition.

2. The picture region extraction method as set forth in claim 1, wherein
in said fourth step, when calculating said coarse-grained conditional probability distribution, the average value of the data included in said each subspace is calculated, and the average value is used to calculate said coarse-grained conditional probability distribution in said each subspace.

3. The picture region extraction method as set forth in claim 1, further comprising,
a tenth step in which whether said coarse-grained resolution is equal to the original resolution or not is examined when said evaluation function satisfies said given terminal condition in said eighth step, and an eleventh step in which the resolution of said subspace is reverted to the original resolution if the resolution of said coarse-graining is not the original resolution,
said fourth, fifth, sixth, seventh, and eighth steps being repeated until the given condition is satisfied, using the class parameter and said class mixture ratio that are retained in said ninth step as the initial value in said third step.

4. The picture region extraction method as set forth in claim 1, wherein
in said fourth step, when calculating said coarse-grained conditional probability distribution, the average value of the data included in said each subspace is calculated, and the average value is used to calculate said coarse-grained conditional probability distribution in said each subspace,
which comprises a tenth step in which whether said coarse-grained resolution is equal to the original resolution or not is examined when said evaluation function satisfies said given terminal condition in said eighth step, and an eleventh step in which the resolution of said subspace is reverted to the original resolution if the resolution of said coarse-graining is not the original resolution,
said fourth, fifth, sixth, seventh, and eighth steps being repeated until the given condition is satisfied, using the class parameter and said class mixture ratio that are retained in said ninth step as the initial value in said third step.

5. The picture region extraction method as set forth in claim 1, wherein
in said ninth step, said estimated class mixture ratio is multiplied by the total number of pixels constituting said picture to calculate the number of pixels belonging to said each class, and said pixels in decreasing order of the class membership probability are selected to determine the pixels belonging to said each class.

6. The picture region extraction method as set forth in claim 1, wherein
in said seventh step, AIC is used as said evaluation function, and the parameter is changed so that the evaluation function may be decreased in said sixth step.

7. The picture region extraction method as set forth in claim 1, wherein
in said seventh step, MDL is used as said evaluation function, and the parameter is changed so that the evaluation function may be decreased in said sixth step.

8. The picture region extraction method as set forth in claim 1, wherein
in said seventh step, Structural Risk is used as said evaluation function, and the parameter is changed so that the evaluation function may be decreased in said sixth step.

9. The picture region extraction method as set forth in claim 1, wherein
said third step comprising
a first step in which a neighborhood radius which defines whether said each subspace is close to one another, and the number of said classes are set;
a second step in which the representative value of each subspace is set for each subspace;
a third step in which the collection of the classification target subspace is set;
a fourth step in which the subspace with the highest coarse-grained empirical probability is selected among said classification target subspaces;
a fifth step in which all the subspaces having a representative value whose distance to the representative value of the subspace with the highest coarse-grained empirical probability falls within the neighborhood radius are selected as a neighborhood collection;
a sixth step in which whether the shortest distance between the representative value of the subspace included in a class for which classification has already been completed, and the representative value of the subspace included in said neighborhood collection is larger than said neighborhood radius is examined;
a seventh step in which said neighborhood collection is defined as a new class if the shortest distance between the representative value of the subspace included in a class for which classification has already been completed and the representative value of the subspace included in said neighborhood collection is larger than said neighborhood radius, said neighborhood collection is deleted from said classification target subspace, and the fourth steps and later are repeated;
an eighth step in which if said shortest distance is equal to or shorter than said neighborhood radius, said neighborhood collection is added to the classified classes, and said neighborhood collection is deleted from said classification target subspace;
a ninth step in which whether said classification target subspace is an empty collection or not is examined;
a tenth step in which if said classification target subspace is not an empty collection, said fourth step and later are repeated, and if said classification target subspace is an empty collection, whether the number of classes for which classification has already been completed is equal to a given number or more is examined;
an eleventh step in which if the number of classes for which classification has already been completed is fewer than the given number, said neighborhood radius is diminished, and said third step and later are repeated;
a twelfth step in which if said classification target subspace is an empty collection and the number of classified classes is greater than a given number, said class parameter is calculated within each class and taken as the initial value of the class parameter, also, the ratio of the number of subspaces included in each class is taken as the initial value of said class mixture ratio.

10. A picture region extraction device, which extracts a desired region from picture data containing an image to be subjected to region extraction by classifying each pixel on the picture into a plurality of classes, comprising:
an input device for reading picture data;
a region coarse-graining device in which the data space constituted by all the attribute values that may be taken by said each pixel on said picture is divided into subspaces with a given resolution, a collection of pixels, each of which takes an attribute value in said each subspace, the average of the attribute values of said pixels, and the number of said pixels are retained to constitute a coarse-grained data space;

a coarse-grained empirical probability distribution calculation device in which the number of pixels in said each subspace is divided by the total number of pixels contained in said picture to calculate the coarse-grained empirical distribution in the coarse-grained data space;

a coarse-grained conditional probability distribution calculation device in which the class parameter, the number of said classes, and the mixture ratio of said classes, which define the attributes of said each class, are initialized, a conditional probability distribution under said class being specified is calculated from the class parameter that defines the attributes of said each class, and the conditional probability distribution under said class being specified is averaged within said each subspace to calculate the coarse-grained conditional probability distribution;

a class membership probability calculation device in which a class membership probability, which is the probability that each pixel constituting said picture belongs to said each class, is calculated by said coarse-grained conditional probability distribution;

a parameter update device in which said parameter is updated so that when a coarse-grained log-likelihood is used as said evaluation function, said evaluation function may be increased and when AIC, MDL, or Structural Risk is used as the evaluation function, the evaluation function may be decreased;

an evaluation function calculation device in which said evaluation function is calculated using either said coarse-grained log-likelihood, said AIC, said MDL, or said Structural Risk;

a region extraction device in which whether said evaluation function satisfies a given termination condition or not is examined, after said evaluation function satisfies said given termination condition, said parameter is retained, and the class said each pixel belongs to is determined based on said class membership probability to extract a region; and an output device for outputting the extracted region.

11. The picture region extraction device as set forth in claim 10, further comprising a resolution reverting device in which after verification that said evaluation function satisfies said given termination condition, whether said coarse-grained resolution is equal to the original resolution or not is examined, and the resolution of said data space is reverted to the original resolution.

12. A computer-implemented process to execute functions for extracting a desired picture region from picture data containing an image to be subjected to region extraction by classifying each pixel on the picture into a plurality of classes, comprising:

a first function in which the data space constituted by all the attribute values that may be taken by said each pixel constituting said picture is divided into subspaces with a given resolution, a collection of pixels, each of which takes an attribute value in said each subspace, the average of the attribute values of said pixels, and the number of said pixels are retained to constitute a coarse-grained space;

a second function in which the number of pixels in said each subspace is divided by the total number of pixels contained in said picture to calculate the coarse-grained empirical probability distribution in the coarse-grained data space;

a third function in which the class parameter, the number of said classes, and the mixture ratio of said classes, which define the attributes of said each class, are initialized;

a fourth function in which a conditional probability distribution under said class being specified is calculated from the class parameter that defines the attributes of said each class, and the conditional probability distribution under said class being specified is averaged within said each subspace to calculate a coarse-grained conditional probability distribution;

a fifth function in which a class membership probability, which is the probability that each pixel constituting said picture belongs to said each class, is calculated by multiplying said class mixture ratio by said coarse-grained conditional probability distribution;

a sixth function in which said class parameter and said class mixture ratio are updated so as to increase an evaluation function;

a seventh function in which a coarse-grained log-likelihood is calculated as said evaluation function using said coarse-grained conditional probability distribution;

an eighth function in which whether said evaluation function satisfies a given termination condition or not is examined; and a ninth function in which after said evaluation function satisfies said given termination condition, said class parameter and said class mixture ratio are retained, and the region each pixel belongs to is determined based on said class membership probability to extract said desired region, said fourth, fifth, sixth, seventh, and eighth functions being repeated until said evaluation function satisfies said given condition.

13. The computer-implemented process as set forth in claim 12, wherein said fourth function comprises a function in which, when calculating said coarse-grained conditional probability distribution, the average value of the data included in said each subspace is calculated, and the average value is used to calculate said coarse-grained conditional probability distribution in said each subspace.

14. The computer-implemented process as set forth in claim 12, further comprising a tenth function in which whether said coarse-grained resolution is equal to the original resolution or not is examined when said evaluation function satisfies said given terminal condition in said eighth function, and an eleventh function in which the resolution of said subspace is reverted to the original resolution if the resolution of said coarse-graining is not the original resolution, said fourth, fifth, sixth, seventh, and eighth functions being repeated until said evaluation function satisfies the given condition, using the class parameter and said class mixture ratio that are retained in said ninth function as the initial value in said third function.

15. The computer-implemented process as set forth in claim 12, wherein said fourth function comprises a function in which, when calculating said coarse-grained conditional probability distribution, the average value of the data included in said each subspace is calculated, and the average value is used to calculate said coarse-grained conditional probability distribution in said each subspace, which comprises a tenth function in which whether said coarse-grained resolution is equal to the original resolution or not is examined when said evaluation function satisfies said given terminal condition in said eighth function, and an eleventh function in which the resolution of said subspace is reverted to the original resolution if the resolution of said coarse-graining is not the original resolution, said fourth, fifth, sixth, seventh, and eighth functions being repeated until said evaluation function satisfies the given condition, using the class parameter and said class mixture ratio that are retained in said ninth function as the initial value in said third function.

16. The computer-implemented process as set forth in claim 12, wherein said ninth function comprises a function in which said estimated class mixture ratio is multiplied by the total number of pixels constituting said picture to calculate the number of pixels belonging to said each class, and said pixels in decreasing order of the class membership probability are selected to determine the pixels belonging to said each class.

17. The computer-implemented process as set forth in claim 12, wherein said seventh function is a function for calculating AIC instead of said coarse-grained log-likelihood as said evaluation function, and said sixth function is a function for changing the parameter so that the evaluation function may be decreased.

18. The computer-implemented process as set forth in claim 12, wherein said seventh function is a function for calculating MDL instead of said coarse-grained log-likelihood as said evaluation function, and said sixth function is a function for changing the parameter so that the evaluation function may be decreased.

19. The computer-implemented process as set forth in claim 12, wherein said seventh function is a function for calculating Structural Risk instead of said coarse-grained log-likelihood as said evaluation function, and said sixth function is a function for changing the parameter so that the evaluation function may be decreased.

20. The computer-implemented process as set forth in claim 12, wherein said third function further comprising a first step in which a neighborhood radius which defines whether said each subspace is close to one another, and the number of said classes are set;

a second step in which the representative value of each subspace is set for each subspace;

a third step in which the collection of the classification target subspace is set;

a fourth step in which the subspace with the highest coarse-grained empirical probability is selected among said classification target subspaces;

a fifth step in which all the subspaces having a representative value whose distance to the representative value of the subspace with the highest coarse-grained empirical probability falls within the neighborhood radius are selected as a neighborhood collection;

a sixth step in which whether the shortest distance between the representative value of the subspace included in a class for which classification has already been completed, and the representative value of the subspace included in said neighborhood collection is larger than said neighborhood radius is examined;

a seventh step in which said neighborhood collection is defined as a new class if the shortest distance between the representative value of the subspace included in a class for which classification has already been completed and the representative value of the subspace included in said neighborhood collection is larger than said neighborhood radius, said neighborhood collection is deleted from said classification target subspace, and the fourth steps and later are repeated;

an eighth step in which if said shortest distance is equal to or shorter than said neighborhood radius, said neighborhood collection is added to the classified classes, and said neighborhood collection is deleted from said classification target subspace;

a ninth step in which whether said classification target subspace is an empty collection or not is examined;

a tenth step in which if said classification target subspace is not an empty collection, said fourth step and later are repeated, and if said classification target subspace is an empty collection, whether the number of classes for which classification has already been completed is equal to a given number or more is examined;

an eleventh step in which if the number of classes for which classification has already been completed is fewer than the given number, said neighborhood radius is diminished, and said third step and later are repeated;

a twelfth step in which if said classification target subspace is an empty collection and the number of classified classes is greater than a given number, said class parameter is calculated within each class and taken as the initial value of the class parameter, also, the ratio of the number of subspaces included in each class is taken as the initial value of said class mixture ratio.

* * * * *